United States Patent
Vasa

(10) Patent No.: US 6,308,218 B1
(45) Date of Patent: *Oct. 23, 2001

(54) ADDRESS LOOK-UP MECHANISM IN A MULTI-PORT BRIDGE FOR A LOCAL AREA NETWORK

(75) Inventor: Suresh Vasa, Cupertino, CA (US)

(73) Assignees: Sony Corporation, Tokyo (JP); Sony Electronics, Inc., Park Ridge, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/094,237

(22) Filed: Jun. 9, 1998

Related U.S. Application Data

(60) Provisional application No. 60/059,171, filed on Sep. 17, 1997.

(51) Int. Cl.[7] .................................................. G06F 15/16
(52) U.S. Cl. .................... 709/238; 709/238; 709/244; 711/200; 711/205; 711/216; 713/162
(58) Field of Search .................................. 709/238, 242, 709/244, 245; 711/200, 205, 206, 207, 216; 713/162

(56) References Cited

U.S. PATENT DOCUMENTS

H586    2/1989   Kun ........................................ 370/94

(List continued on next page.)

FOREIGN PATENT DOCUMENTS 0 397 188 A2    11/1990   (EP) ............................. H04L/12/46

(List continued on next page.)

OTHER PUBLICATIONS

William Stallings, "Internetworking: A Guide for the Perplexed," Telecommunications, North American Edition, Sep. 1989, pp. 25–30.

(List continued on next page.)

Primary Examiner—Robert B. Harrell
Assistant Examiner—Steve Willett
(74) Attorney, Agent, or Firm—Haverstock & Owens LLP

(57) ABSTRACT

An address look-up mechanism in a multi-port bridge for controlling use of a memory as a look-up table for appropriately filtering and directing packets. The look-up table includes learned look-up tables, permanent look-up tables and linked lists. As a data packet originating from a node (source node) is received by a corresponding one of the ports (source port) of the multi-port bridge, a look-up cycle and then a learning cycle are each performed. During the learning cycle, an identification of the source port for the packet is stored in the learned look-up tables in association with a hashed node address of the source node. Each existing entry is examined to ensure that the appropriate port identification is stored and to determine whether two or more nodes share a same hashed node address. If two nodes have the same hashed node address, then a linked entry in the linked lists is formed. During the look-up cycle, the packet is examined to determine whether it is intended for a VLAN group, if the packet is to be broadcast to all nodes of the LAN or if the packet is intended for a single destination node. If the packet is intended for a VLAN group, the source node address for the packet is utilized to access an appropriate entry in the permanent table. If the packet is intended to be broadcast to all the nodes of the LAN, the packet is directed to all the ports. If the packet is intended for a single destination node, information stored in the learned look-up tables during learning cycles for prior packets is utilized to identify an appropriate destination port for the packet.

22 Claims, 12 Drawing Sheets

U.S. PATENT DOCUMENTS

| | | | |
|---|---|---|---|
| Re. 33,426 | 11/1990 | Sugimoto et al. | 370/85.14 |
| 3,735,357 | 5/1973 | Maholick et al. | 340/172.5 |
| 4,213,201 | 7/1980 | Gagnier et al. | 370/62 |
| 4,589,120 | 5/1986 | Mendala | 375/117 |
| 4,597,078 | 6/1986 | Kempf | 370/94 |
| 4,627,052 | 12/1986 | Hoare et al. | 370/88 |
| 4,706,081 | 11/1987 | Hart et al. | 340/825.03 |
| 4,707,827 | 11/1987 | Bione et al. | 370/85 |
| 4,710,769 | 12/1987 | Friedmen et al. | 340/825.03 |
| 4,715,030 | 12/1987 | Koch et al. | 370/85 |
| 4,718,060 | 1/1988 | Oguchi et al. | 370/85 |
| 4,723,311 | 2/1988 | Moustakas et al. | 455/612 |
| 4,727,537 | 2/1988 | Nichols | 370/85 |
| 4,727,538 | 2/1988 | Furchtgott et al. | 370/85 |
| 4,737,953 | 4/1988 | Koch et al. | 370/94 |
| 4,744,078 | 5/1988 | Kowalczyk | 370/85 |
| 4,797,879 | 1/1989 | Habbab et al. | 370/3 |
| 4,823,338 | 4/1989 | Chan et al. | 370/85 |
| 4,849,962 | 7/1989 | Morimoto et al. | 370/29 |
| 4,878,216 | 10/1989 | Yunoki | 370/60 |
| 4,901,308 | 2/1990 | Deschaine | 370/58.1 |
| 4,905,219 | 2/1990 | Barr et al. | 370/4 |
| 4,933,937 * | 6/1990 | Konishi . | |
| 4,935,922 | 6/1990 | Wicklund et al. | 370/60 |
| 5,016,159 | 5/1991 | Maruyama | 364/200 |
| 5,020,052 | 5/1991 | DePrycker et al. | 370/60 |
| 5,027,350 * | 6/1991 | Marshall . | |
| 5,048,014 | 9/1991 | Fischer | 370/85.5 |
| 5,107,489 | 4/1992 | Brown et al. | 370/58.2 |
| 5,119,367 | 6/1992 | Kawakatsu et al. | 370/54 |
| 5,140,585 | 8/1992 | Tomikawa | 370/60.1 |
| 5,151,897 | 9/1992 | Suzuki | 370/85.13 |
| 5,151,994 | 9/1992 | Wille et al. | 395/800 |
| 5,166,926 | 11/1992 | Cisneros et al. | 370/60 |
| 5,184,346 | 2/1993 | Kozaki et al. | 370/60 |
| 5,229,993 | 7/1993 | Foudriat et al. | 370/85.3 |
| 5,241,550 | 8/1993 | Kusano | 371/71 |
| 5,243,699 | 9/1993 | Nickolls et al. | 395/275 |
| 5,274,631 | 12/1993 | Bhardwaj | 370/60 |
| 5,307,345 | 4/1994 | Lozowick et al. | 370/61 |
| 5,337,309 * | 8/1994 | Faulk, Jr. | 370/60 |
| 5,339,316 | 8/1994 | Diepstraten | 370/85.13 |
| 5,353,353 | 10/1994 | Vijeh et al. | 380/29 |
| 5,379,289 | 1/1995 | DeSouza et al. | 370/85.13 |
| 5,379,296 | 1/1995 | Johnson et al. | 370/60 |
| 5,386,413 | 1/1995 | McAuley et al. | 370/54 |
| 5,404,459 | 4/1995 | Gulick et al. | 395/275 |
| 5,410,754 | 4/1995 | Klotzbach et al. | 370/85.13 |
| 5,430,762 | 7/1995 | Vijeh et al. | 375/211 |
| 5,432,511 | 7/1995 | Sadjadian et al. | 341/61 |
| 5,434,861 | 7/1995 | Pritty et al. | 370/85.8 |
| 5,442,578 | 8/1995 | Hattori | 364/746.1 |
| 5,446,726 | 8/1995 | Rostoker et al. | 370/17 |
| 5,448,565 | 9/1995 | Chang et al. | 370/85.13 |
| 5,457,446 | 10/1995 | Yamamoto | 340/825.24 |
| 5,457,679 | 10/1995 | Eng et al. | 370/16 |
| 5,481,540 | 1/1996 | Huang | 370/85.13 |
| 5,487,067 | 1/1996 | Matsushige | 370/85.7 |
| 5,502,748 | 3/1996 | Wilkinson | 375/354 |
| 5,506,902 | 4/1996 | Kubota | 380/9 |
| 5,515,376 | 5/1996 | Murthy et al. | 370/85.13 |
| 5,515,513 | 5/1996 | Metzger et al. | 395/200.15 |
| 5,517,494 * | 5/1996 | Green . | |
| 5,521,913 | 5/1996 | Gridley | 370/58.2 |
| 5,522,059 | 5/1996 | Marushima et al. | 395/476 |
| 5,530,434 | 6/1996 | Kanda | 340/825.04 |
| 5,541,923 | 7/1996 | Kato | 370/85.1 |
| 5,550,826 | 8/1996 | Tanaka et al. | 370/85.8 |
| 5,559,796 | 9/1996 | Edem et al. | 370/60 |
| 5,560,038 | 9/1996 | Haddock | 395/800 |
| 5,565,929 | 10/1996 | Tanaka | 348/565 |
| 5,568,476 | 10/1996 | Sherer et al. | 370/60 |
| 5,568,643 | 10/1996 | Tanaka | 395/739 |
| 5,570,330 | 10/1996 | Okawa | 369/44.32 |
| 5,570,466 | 10/1996 | Oechsle | 395/200.15 |
| 5,598,161 | 1/1997 | Yamada | 341/159 |
| 5,598,278 | 1/1997 | Tanaka et al. | 386/96 |
| 5,598,391 | 1/1997 | Mukawa | 369/54 |
| 5,598,581 | 1/1997 | Daines et al. | 395/872 |
| 5,600,664 | 2/1997 | Hayashi | 371/43 |
| 5,602,851 | 2/1997 | Terashita et al. | 370/403 |
| 5,608,730 | 3/1997 | Osakabe et al. | 370/471 |
| 5,608,879 | 3/1997 | Cooke | 395/290 |
| 5,610,905 * | 3/1997 | Murthy et al. | 370/401 |
| 5,617,421 * | 4/1997 | Chin et al. | 370/402 |
| 5,621,725 | 4/1997 | Kawamura et al. | 370/43 |
| 5,640,399 | 6/1997 | Rostoker et al. | 370/392 |
| 5,680,622 * | 10/1997 | Even . | |
| 5,721,927 * | 2/1998 | Baraz et al. . | |
| 5,751,952 * | 5/1998 | Dai et al. | 395/200.8 |
| 5,757,795 * | 5/1998 | Schnell | 370/392 |
| 5,761,435 | 6/1998 | Fukuda et al. | 395/200.68 |
| 5,764,895 | 6/1998 | Chung | 395/700.8 |
| 5,796,944 * | 8/1998 | Hill et al. | 395/200.8 |
| 5,802,047 | 9/1998 | Kinoshita | 370/359 |
| 5,805,816 | 9/1998 | Picazo, Jr. et al. | 395/200.53 |
| 5,844,903 | 12/1998 | Terashita et al. | 370/403 |
| 5,852,607 * | 12/1998 | Chin . | |
| 5,857,075 | 1/1999 | Chung | 395/200.53 |
| 5,859,837 | 1/1999 | Crayford | 370/230 |
| 5,864,554 * | 1/1999 | Rostoker et al. | 370/395 |
| 5,878,028 | 3/1999 | Roy et al. | 370/235 |
| 5,884,040 * | 3/1999 | Chung | 395/200.57 |
| 5,917,821 | 6/1999 | Gobuyan et al. | 370/392 |
| 5,923,654 * | 7/1999 | Schnell . | |
| 5,923,660 * | 7/1999 | Shemla et al. . | |
| 5,926,473 | 7/1999 | Gridley | 370/389 |
| 5,940,596 | 8/1999 | Rajan et al. | 395/200.72 |
| 5,940,597 * | 8/1999 | Chung | 395/200.72 |
| 5,946,308 * | 8/1999 | Dobbins et al. | 370/392 |
| 5,949,788 | 9/1999 | Friedman et al. | 370/431 |
| 5,951,651 | 9/1999 | Lakshman et al. | 709/239 |
| 5,978,378 | 11/1999 | Van Seters et al. | 370/401 |
| 5,991,305 | 11/1999 | Simmons et al. | 370/422 |
| 6,018,526 * | 1/2000 | Liu et al. . | |
| 6,044,080 * | 3/2000 | Antonov . | |
| 6,067,300 | 5/2000 | Baumert et al. | 370/413 |
| 6,070,205 | 5/2000 | Kato et al. | 710/100 |
| 6,075,773 | 6/2000 | Clark et al. | 370/241 |
| 6,081,532 * | 6/2000 | Fiammante . | |
| 6,084,877 * | 7/2000 | Egbert et al. . | |
| 6,088,356 * | 7/2000 | Hendel et al. . | |
| 6,091,725 | 7/2000 | Cheriton et al. | 370/392 |
| 6,094,434 * | 7/2000 | Kotzur et al. . | |
| 6,098,110 * | 8/2000 | Witkowski et al. . | |
| 6,108,345 | 8/2000 | Zhang | 370/445 |
| 6,111,874 * | 8/2000 | Kerstein . | |
| 6,122,277 | 9/2000 | Garmire et al. | 370/390 |
| 6,130,891 | 10/2000 | Lam et al. | 370/401 |
| 6,137,797 | 10/2000 | Bass et al. | 370/392 |

FOREIGN PATENT DOCUMENTS

| | | | |
|---|---|---|---|
| 0597789 A1 | 5/1994 | (EP) | H04L/12/46 |
| 0 609 626 A2 | 8/1994 | (EP) | H04L/12/50 |
| 0 642 246 A2 | 3/1995 | (EP) | H04L/29/06 |
| 0785698 A2 | 7/1997 | (EP) | H04Q/11/04 |
| WO 96/13922 | 5/1996 | (WO) | H04L/12/44 |
| WO 96/21302 | 7/1996 | (WO) | H04L/12/46 |
| WO 97/18657 | 5/1997 | (WO) | H04L/12/18 |

OTHER PUBLICATIONS

Bob Stewart and Bill Hawe, "Local Area Network Applications," Telecommunications, North American Edition, Sep. 1984, pp. 96f–96j, and 96u.

Bob Stewart, Bill Hawe, and Alan Kirby, "Local Area Network Connection," Telecommunications, North American Edition, Sep. 1984, pp. 54–55,58–59 and 66.

National Semiconductor, databook, "DP83934 SONIC™–T Systems–Oriented Network Interface Controller with Twisted Pair Interface" pp. 1–457 to 1–458, 1–468 to 1–477, 1–480, 1–512, 1–527–to 1–529.

NEC Data Sheet, MOS Integrated Circuit μPD4516421, 4516821, 4516161 16M–bit Synchronous DRAM, Nov. 1995.

Printout of internet website http://www.ti.com/sc/docs/network/tswitch/product.htm#3150al, ThunderSWITCH Product Information, "ThunderSWITCH Product Descriptions," Feb. 1997.

Texas Instruments Product Preview SPWS027, "TNETX3150 ThunderSWITCH™ 15–Port 10–/100–MBIT/S Ethernet™ Switch," pp. 1–85, Sep. 1996.

Hemant Kanakia and David R. Cheriton, "The VMP Network Adapter Board (NAB): High–Performance Network Communication for Multiprocessors," Computer Communications Review, vol. 18, No. 4, pp. 175–187, 1988.

* cited by examiner

ADDRESS LOOK-UP MECHANISM IN A MULTI-PORT BRIDGE FOR A LOCAL AREA NETWORK

This application claims the benefit of U.S. Provisional Application No. 60/059,171, filed Sep. 17, 1997, entitled, "MULTI-PORT BRIDGE FOR A LOCAL AREA NETWORK."

FIELD OF THE INVENTION

The invention relates to a multi-port bridge for a local area network. More particularly, the invention relates to an address look-up mechanism in a multi-port bridge for controlling the use of a memory device as a look-up table for appropriately filtering and directing packets through the multi-port bridge.

BACKGROUND OF THE INVENTION

Nodes of a local area network (LAN) are typically interconnected by a shared transmission medium. The amount of data traffic that the shared transmission medium can accommodate, however, is limited. For example, only one node at a time can successfully transmit data to another node over the shared transmission medium. If two or more nodes simultaneously attempt to transmit data, a data collision occurs, which tends to corrupt the data being transmitted. Thus, nodes that share a transmission medium are considered to be in a same collision domain.

A multi-port bridge allows simultaneous communication between nodes of the LAN by segmenting the LAN into multiple collision domains (also referred to as network segments), each segment having a corresponding transmission medium. FIG. 1 illustrates a conventional local area network (LAN) including a multi-port bridge 20. The multi-port bridge 20 in this example has eight ports A–H, though the number of ports can vary. Each port A–H is connected to a segment 21–28 of the LAN. Each segment 21–28 typically includes one or more nodes 29–44, such as a workstation, a personal computer, a data terminal, a file server, a printer, a facsimile, a scanner or other conventional digital device. Each of the nodes 29–44 has an associated node address which uniquely identifies the node. The nodes 29–44 are configured to send data, one to another.

When the LAN operates according to Ethernet standards, such as the Institute of Electrical and Electronics Engineers (IEEE) 802.3 standard, data is communicated in the form of discrete packets. FIG. 2 illustrates a conventional IEEE 802.3 data packet 50. The data packet 50 includes an eight byte long pre-amble 51 which is generally utilized for synchronizing a receiver to the data packet 50. The pre-amble includes seven bytes of pre-amble and one byte of start-of-frame. Following the pre-amble 51, the data packet 50 includes a six byte long destination address 52, which is the node address of a node which is an intended recipient for the data packet 50. Next, the data packet 50 includes a six byte long source address 53, which is the node address of a node which originated the data packet 50. Following source address 53 is a two-byte length field 54. Following the length field 54 is a data field 55. The data field 55 can be up to 1500 bytes long. Finally, the data packet 50 includes a four byte long frame check field 56 which allows a recipient of the data packet 50 to determine whether an error has occurred during transmission of the data packet 50.

When a node (source node) sends data to another node (destination node) located on its same segment of the LAN (intra-segment communication), the data is communicated directly between the nodes without intervention by the multi-port bridge 20 and is known as an intra-segment packet. Therefore, when the multi-port bridge 20 receives an intra-segment packet, the multi-port bridge 20 does not bridge the packet (the packet is filtered). When a node (source node) sends a data packet to another node (destination node) located on a different segment (inter-segment communication) the multi-port bridge 20 appropriately forwards the data packet to the destination node.

Accordingly, what is needed is a technique for providing a multi-port bridge with an accurate and readily available look-up table which stores information indicative of which nodes of the LAN are associated with each of port of the multi-port bridge. What is further needed is a technique for generating, accessing and maintaining the look-up table.

SUMMARY OF THE INVENTION

The invention is an address look-up mechanism in a multi-port bridge for controlling the use of a memory device as a look-up table for appropriately filtering and directing packets through the multi-port bridge. The multi-port bridge includes the memory device, a switch engine and a plurality of ports, all of which are interconnected by a high speed communication bus. The switch engine includes a look-up controller, a bus controller and a memory controller, each preferably being a finite state machine. The look-up controller implements the address look-up mechanism by generating and maintaining look-up tables in the memory device and by utilizing the look-up tables for determining to which port each packet is to be directed. The memory controller provides an interface between the memory and the communication bus. The bus controller controls access to the communication bus by collecting requests and granting the requests according to an appropriate priority.

The high speed communication bus includes single-bit signal lines dedicated to communicating control commands, signal lines dedicated to communicating data, and several signal lines having special purposes. For example, two signal lines are preferably dedicated to initiating access to the bus, each having a respective priority, another signal line is dedicated to jam requests (for applying backpressure), still another signal line is dedicated to the memory controller and yet another signal line is dedicated to providing a bus clock signal.

The memory devices includes a look-up table utilized for appropriately directing data packets among the ports, packet buffers utilized for temporarily storing packets and mailboxes for providing an interface between the switch engine and an external processor. The look-up table includes learned look-up tables, a permanent look-up table and linked lists.

Each port includes a port controller, a MAC transceiver, a receive finite state machine, a transmit finite state machine, a receive buffer, a transmit buffer and a memory pointer buffer. Packets received from a LAN segment by the transceiver are directed to the communication bus through the receive buffer, while packets to be transmitted over the LAN segment are directed to the transceiver through the transmit buffer. The memory pointer buffer stores memory pointers in a queue for transmission by the port, one memory pointer for each data packet being stored in the packet buffers of the memory.

A data packet originating from a node (source node) in a segment of the LAN is received by the receive buffer of a corresponding one of the ports (source port) of the multi-port bridge. As the packet is still being received, the look-up controller performs a look-up cycle on the packet and then a learning cycle.

During the learning cycle, an identification of the source port for the packet is stored in the learned look-up tables in association with a node address of the source node. Each entry is stored at a location in the learned look-up tables identified by hashing the node address. If an entry in the look-up table already exists at the hashed node address, the entry is examined to determine if the appropriate port identification is stored and to determine whether two or more nodes share a same hashed node address. If the port identification is inappropriate, it is corrected. If two nodes have the same hashed node address, then a linked entry in the linked lists is formed to appropriately identify which port is associated with each of the two nodes.

The multi-port bridge preferably implements a virtual local area network (VLAN) when the switch engine is configured in a VLAN mode. The VLAN mode allows nodes of a LAN to be arranged in VLAN groups. For example, a VLAN group can include all the workstations in a particular department of an organization. Information indicative of which nodes of the LAN are arranged into each VLAN (group is stored in the permanent tables of the memory device.

During the look-up cycle, the packet is examined to determine whether the packet is intended for a VLAN group, whether the packet is intended to be broadcast to all nodes of the LAN and whether the packet is intended for a single destination node. If the packet is intended for a VLAN group, the packet is a multi-cast packet. In which case, the source node address for the packet is utilized to access an appropriate entry in the permanent table. Each entry in the permanent table identifies the destination ports for the packet according to the source node address for the packet. If the packet is intended to be broadcast to all the nodes of the LAN, the packet is directed to all the ports of the multi-port bridge (or to all the ports other than the source port). If the packet is intended for a single destination node, information stored in the learned look-up tables during learning cycles for prior packets is utilized to identify an appropriate destination port for the packet. If the learned look-up tables do not identify the appropriate port, the packet is treated as a broadcast packet or a multi-cast packet depending upon whether the switch engine is configured in the VLAN mode; if the switch engine is configured in the VLAN mode, the packet is treated as a multi-cast packet, and if the switch engine is not configured in the VLAN mode, the packet is treated as a broadcast packet.

The communication bus is monitored by each port. Upon completion of the look-up cycle, the look-up controller indicates which are the destination ports for the packet via the communication bus. If the source port and the destination port are the same, this indicates that the source and destination nodes are on the same segment of the LAN (intra-segment communication) and the packet is filtered. Otherwise, if a port identified as a destination port is not currently busy transmitting or receiving another packet, such destination port configures itself to receive the packet directly from the source port (cut-through).

However, if the memory pointer buffer of the destination port is nearly full, the bus controller of the destination port applies a jam request signal to the communication bus. The source port receives the jam request and, in response, discards the incoming packet and also sends a jam signal over its associated segment. The jam signal causes the node (source node) which is the source of the packet to discontinue sending the packet and attempt to resend the packet after a waiting period.

Assuming the memory pointer buffer for the destination port is not nearly full (no jam request is made), the packet is loaded from the receive buffer of the source port into the packet buffers of the memory starting at the memory address identified in the memory pointer. Writing of the packet into the packet buffers preferably occurs as the remainder of the packet is still being received into the receive buffer of the source port. For this reason, the receive buffer for each port need not be capable of storing the entire data packet. In addition, if the destination port is configured for cut-through, the destination port receives the packet into its transmit buffer directly from the communication bus simultaneously with the write cycles for loading of the packet into the packet buffers. During such a cut-through operation, the packet is received into a transmit buffer of the destination port for immediate transmission to the LAN segment associated with the destination port.

Once the entire packet has been loaded into the packet buffers, the memory pointer is placed on the data lines of the communication bus. Each destination port stores the memory pointer in its memory pointer buffer. Thus, the packet is queued for transmission by the destination port. Then, when the destination port is no longer busy, the destination port retrieves the packet from the packet buffers.

While the destination port is receiving the packet into its transmit buffer from the packet buffers or directly from the source port, the destination port begins transmitting the packet to the network segment associated with the destination port. For this reason, the transmit buffer for each port need not be capable of storing an entire data packet. The destination node for the packet then begins to receive the packet from the network segment.

DETAILED DESCRIPTION OF A PREFERRED EMBODIMENT

In the preferred embodiment, the present invention is utilized for appropriately directing packets through a multi-port bridge for an Ethernet LAN. It will be apparent, however, that other devices in an Ethernet LAN, such as a switch or a router, or devices in a network operating according to another networking standard, can utilize the advantages of the present invention.

The following documents are hereby incorporated by reference: U.S. patent application Ser. No. 08/946,866, filed Oct. 8, 1997, and entitled, "PER-PACKET JAMMING IN A MULTI-PORT BRIDGE FOR A LOCAL AREA NETWORK"; U.S. patent application Ser. No. 08/947,081, filed Oct. 8, 1997, and entitled, "METHOD AND APPARATUS FOR PERIODICALLY UPDATING ENTRIES IN A CONTENT ADDRESSABLE MEMORY"; U.S. patent application Ser. No. 09/025,355, filed Feb. 18, 1998, and entitled, "MEMORY CONTROLLER IN A MULTI-PORT BRIDGE FOR A LOCAL AREA NETWORK"; and U.S. patent application Ser. No. 09/025,356, filed Feb. 18, 1998, and entitled, "HIGH SPEED BUS STRUCTURE IN A MULTI-PORT BRIDGE FOR A LOCAL AREA NETWORK."

Figure 3:
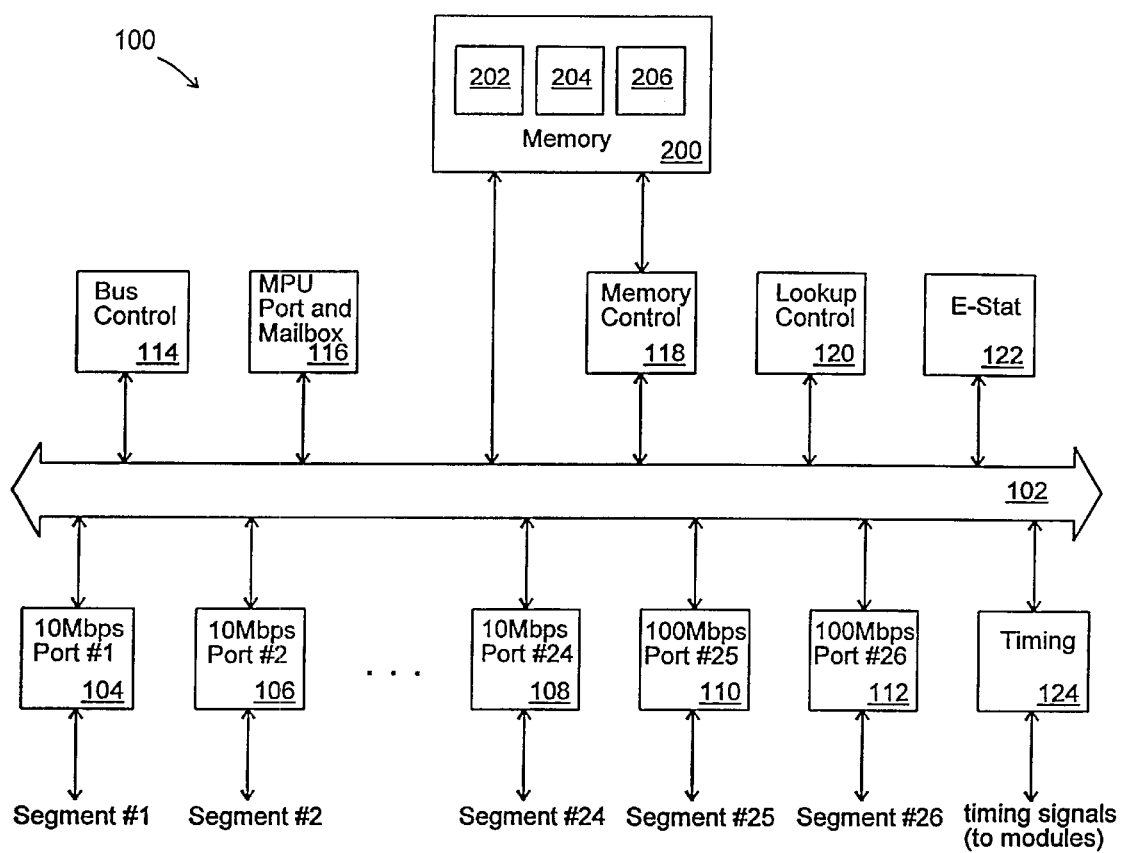
FIG. 3 illustrates a block schematic diagram of a switch engine for a multi-port bridge according to the present invention.

FIG. 3 illustrates a block schematic diagram of a switch engine 100 for a multi-port bridge according to the present invention. A high speed communication bus 102 provides an interconnection for each of the functional blocks 104–124 of the switch engine 100. According to the preferred embodiment, twenty-four 10 Mbps ports 104–108 and two 100 Mbps ports 110–112 are each coupled to the communication bus 102 and can be coupled to a respective LAN segment, each LAN segment having one or more nodes. Each of the twenty-four 10 Mbps ports 104–108 transmit and receive data packets at a rate of 10 Mbps, whereas, the two 100 Mbps ports 110–112 transmit and receive data packets at a rate of 100 Mbps. It will be apparent, however, that other numbers of ports and other port configurations can be utilized.

A bus control module 114 controls access to the communication bus 102 by collecting requests from the ports 104–112 and from the other modules. Based upon the requests, the bus control module 114 grants access to the communication bus 102 according to an appropriate priority, as explained herein. The bus control module 114 also controls access to a memory device 200 by an external processor 600 (FIG. 13), as explained herein. An MPU port and mailbox module 116 provides an interface between the switch engine 100 and the external processor 600 for performing various functions, as is also explained herein. These functions include loading data into registers of the switch engine 100, reading data from registers of the switch engine 100 and transferring data packets between the external processor 600 and the ports 104–112 of the switch engine 100.

A memory control module 118 provides an interface between the memory device 200 and the communication bus 102 and also provides an interface between the memory device 200 and a look-up control module 120. The memory device 200 includes mailboxes 202 for exchanging information between the external processor 600 and the switch engine 100. In addition, the memory device includes look-up tables 204. The look-up tables 204 include entries which indicate which port of the switch engine 100 is associated with each node of the LAN and also include group addresses for multi-cast packets. The look-up tables 204 are utilized for appropriately directing among the ports 104–112 data packets received by the switch engine 100.

The look-up control module 120 receives addresses of nodes and associated port identifications to be stored in the look-up tables 204 from the communication bus 102. These addresses and identifications are stored in the look-up tables 204. The look-up control module 120 also facilitates utilizing the look-up tables 204 for directing packets among the ports 104–112 based upon the destination address of each packet. The memory device 200 also includes packet buffers 206 for temporarily storing data packets that are being directed through the multi-port bridge. The memory device 200 is preferably an SDRAM device, though other types of memory devices can be utilized, such as DRAM, SRAM, RAM or EDO. In the case of dynamic memory, the memory control module 118 refreshes the memory device 200 as required.

An E-stat module 122 collects data packet routing statistics and provides them to the external processor 600 for performing analysis and network management functions. A timing module 124 provides timing signals to the ports 104–112 and to the other modules 114–122 of the switch engine 100. Preferably, a primary clock signal cycles at 40 MHz. Other clock signals, at 10 MHz and 25 MHz, are derived from the primary clock signal.

Preferably, the modules 114–124 are each implemented as a finite state machine, though the modules 114–124 can alternately be implemented as one or more processors or controllers operating according to stored software programs. Finite state machines are preferred, however, as they can generally perform the necessary operations faster, thus, resulting in a higher packet handling bandwidth for the switch engine 100.

Figure 4:
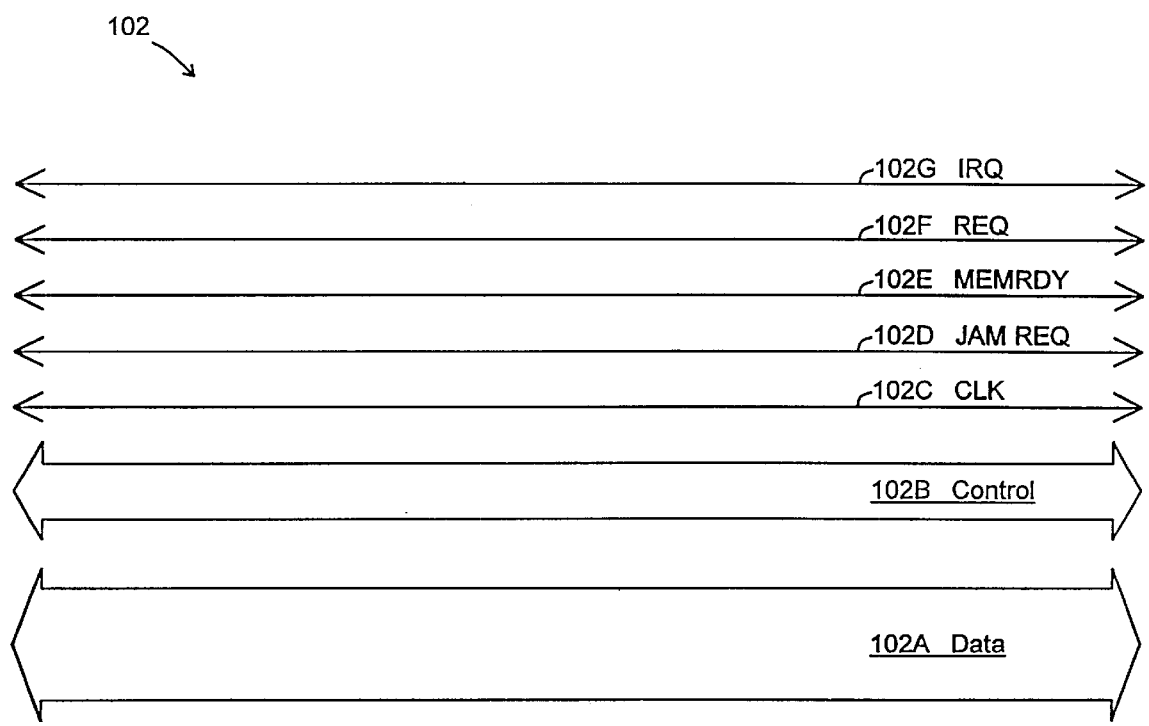
FIG. 4 illustrates a diagram of signal lines included in a high speed communication bus according to the present invention.

FIG. 4 illustrates a diagram of the signal lines included in the high speed communication bus 102 of FIG. 3. The communication bus 102 preferably includes thirty-two data lines 102A, five control lines 102B, a clock CLK line 102C, a jam request JAM REQ line 102D, a memory ready MEMRDY line 102E, a request REQ line 102F and an interrupt IRQ line 102G, though it will be apparent that other bus configurations can be utilized.

Table 1 illustrates preferred commands and associated data appearing on the communication bus 102 during operation of the multi-port bridge 100, as explained herein.

TABLE 1

| Control Code | Data 31-24 | 23-0 | Description |
|---|---|---|---|
| 00 Hex | | | transfer in progress/no action |
| 01 | # of transfer | starting memory address | memory read |
| 02 | # of transfer | starting memory address | memory write |
| 03 | source port ID & dest. and source addresses | | look-up |
| 04 | signal line of port granted access | | bus-grant-for-REQ |
| 05 | signal lines of all interrupting ports | | poll-interrupt |
| 06 | signal lines of all requesting ports | | poll-request |
| 07 | | | reserved |
| 08 | source port ID & bit-map of all dest. ports | | look-up ready |
| 09 | source port ID & dest. and source addresses | | look-up (gated with MEMRDY) |

TABLE 1-continued

| Control Code | Data 31-24 | 23-0 | Description |
|---|---|---|---|
| 0A | | | reserved |
| 0B | | | reserved |
| 0C | register data | | register load |
| 0D | register data | | register read |
| 0E | | | reserved |
| 0F | last transfer (as previously defined) | | bus-release |
| 10 | source port ID & dest. port ID | | new packet transfer to memory (cut-through possible) |
| 11 | source port ID & dest. port ID | | cont. packet transfer to memory (cut-through not possible) |
| 12 | # of transfer | memory starting address | write packet header to memory |
| 13 | | | reserved |
| 14 | signal line of port granted access | | bus-grant-for-IRQ |

Referring to Table 1, the Control Codes (commands) placed on the control lines 102B are given as hexadecimal values, while the associated data applied to the data lines 102A and the function performed by each command are described. Because there are five control lines 102B, there can be up to thirty-two different commands (between 00 H and 1F H). As shown in Table 1, however, fewer commands are preferred. Table 1 shows hexadecimal values for the preferred embodiment. It will be apparent, however, that other bit assignments and another set of commands can be implemented and still follow the teachings of the present invention.

Figure 5:
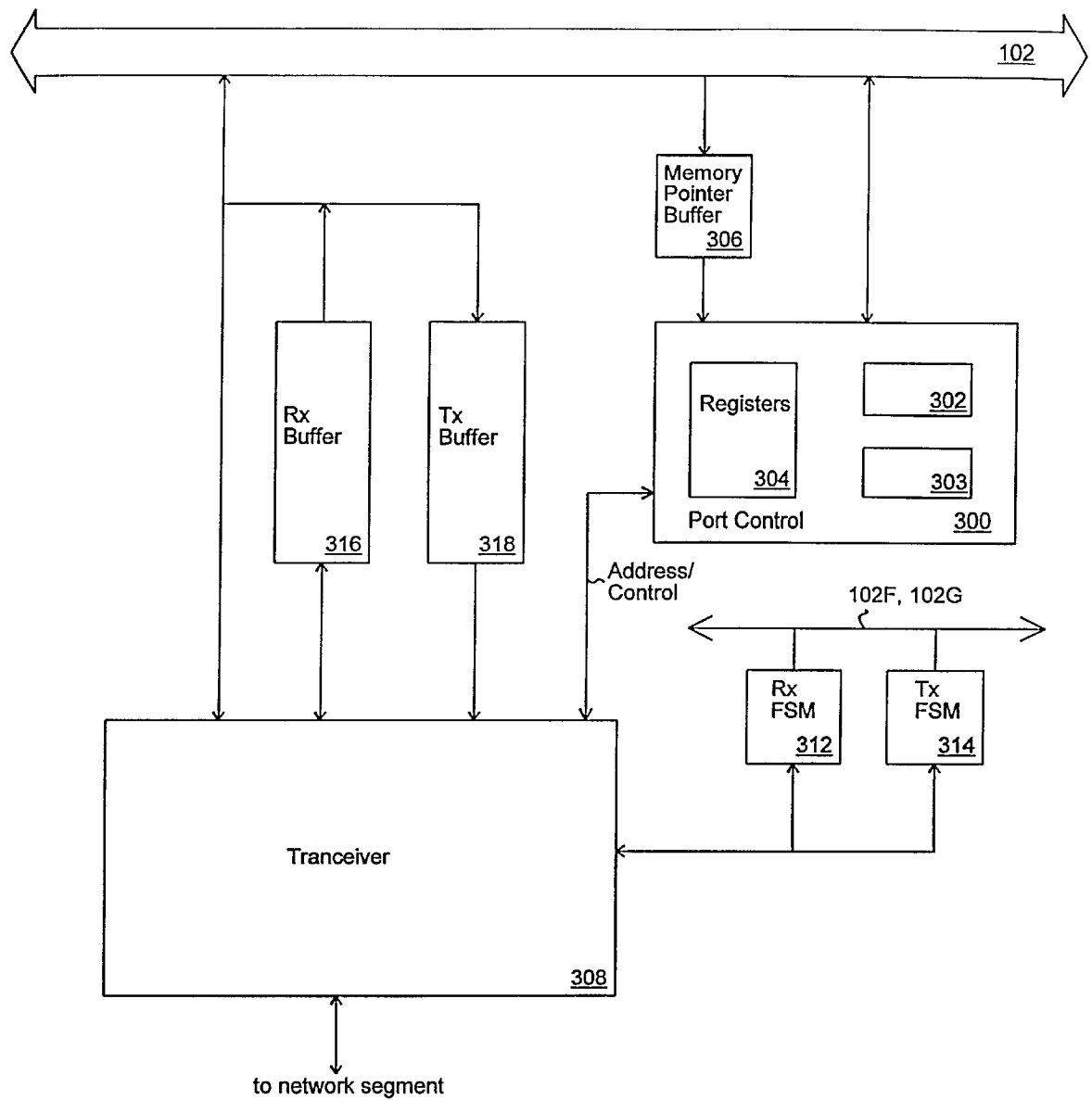
FIG. 5 illustrates a block schematic diagram of a port of the switch engine according to the present invention.

FIG. 5 illustrates a block schematic diagram of one of the ports 104–112 of the multi-port bridge 100 of FIG. 3. A port controller 300, including a bus interface 302, a memory pointer finite state machine (FSM) 303 and registers 304, provides control for the port and an interface between the port and the communication bus 102. The port controller 300 monitors the communication bus 102 for commands and data and also provides commands and data to the communication bus 102 at times when the port has control of the communication bus 102. The registers 304 contain data for configuring the port, initializing the port upon start-up, and for collecting status information for the port. An address latch included in the registers 304 latches addresses from the communication bus 102 and provides them to the transceiver 308. The registers 304 also contain a counter for storing a current state of the finite state machine of the port and registers for storing parameters for use by the finite state machines of the port.

Each port also includes a memory pointer FIFO buffer 306 coupled between the communication bus 102 and the port controller 300. The memory pointer buffer 306 stores memory pointers (explained herein) for data packets being queued in the packet buffers 206 (FIG. 3) of the memory device 200. Preferably, the memory pointers each have a predefined length. In addition, the memory pointer buffer 306 preferably holds 128 memory pointers, though it will be apparent that another capacity for the memory pointer buffer 306 can be selected.

The port also includes a medium access control (MAC) transceiver 308 which accesses a LAN segment 310 for transmitting and receiving data packets to and from the LAN segment 310. Associated with and coupled to the transceiver 308 are a receive finite state machine 312, for controlling the transceiver 308 during packet reception, and a transmit finite state machine 314, for controlling the transceiver 308 during packet transmission.

Packets received from the network segment 310 by the transceiver 308 are directed to the communication bus 102 through a receive FIFO buffer 316, while packets to be transmitted over the LAN segment 310 are directed from the communication bus 102 to the transceiver 308 through a transmit FIFO buffer 318. Preferably, the receive buffer 316 holds 128 bytes while the transmit buffer 318 holds 256 bytes, though other capacities can be selected. Note that an IEEE 802.3 data packet can include up to 1500 bytes of data in addition to the source address, the destination address and the frame check field. Thus, in the preferred embodiment, neither the receive buffer 316, nor the transmit buffer 318 is capable of storing a entire IEEE 802.3 data packet of the maximum size. An address latch is also included in the port for latching addresses from the communication bus 102 and for providing them to the transceiver 308. The receive finite state machine 312 and the transmit finite state machine 314 are each coupled to the bus control module 114 (FIG. 3) for initiating access to the communication bus 102 by the port.

Access to the communication bus 102 is obtained in the following manner. The bus control module 114 monitors the interrupt IRQ line 102G and the request REQ line 102F. A port requiring access to the bus 102 raises the IRQ line 102G or the request REQ line 102F, depending upon the circumstances. The bus control module 114 grants access to the bus 102 according to an appropriate priority. Preferably, an interrupt IRQ is granted access to the bus 102 according to a higher priority than a request REQ. According to the preferred embodiment, ports having a higher data rate have a higher priority than ports having a lower data rate. For example, the 100 Mbps ports 110–112 have a higher priority than the 10 Mbps ports 104–108. Further, assuming equal data rates, a port serviced more recently has a lower priority than a port serviced less recently.

When the bus is available after receiving an interrupt IRQ, the bus control module 114 responds to the interrupt IRQ by placing a poll-interrupt command 05 H (Table 1) on the control lines 102B of the bus 102. While the poll-interrupt command 05 H is on the control lines 102B, each port having a pending interrupt IRQ raises a corresponding one signal line of the data lines 102A. For this purpose, each of the ports 104–112 and the external micro-processor 600 (FIG. 13) are assigned a respective one signal line of the data lines 102A. Accordingly, the bus control module 114 discovers which of the ports has a pending interrupt by monitoring the data lines 102A while the poll-interrupt command 05 H is active. The bus control module 114 then grants access to the bus 102 in an appropriate priority by placing a bus-grant-for-IRQ command 14 H (Table 1) on the control lines 102B of the bus 102 and also raises the respective one signal line of the data lines 102A that corresponds to the port being granted access to the bus 102. Upon being granted access to the bus 102, the designated port then has control of the bus 102.

Similarly, when the bus 102 is available after receiving a request REQ, the bus control module 114 places a poll-request command 06 H (Table 1) on the control lines 102B of the bus 102. While the poll-request command 06 H is on the control lines 102B, each port having a pending request REQ raises its corresponding one signal line of the data lines 102A. The bus control module 114 discovers which of the ports has a pending request by monitoring the data lines 102A while the poll-request command 06 H is active. The bus control module 114 then grants access to the bus 102 in an appropriate priority by placing a bus-grant-for-REQ command 04 H (Table 1) on the control lines 102B of the bus 102 and also raises the one signal line of the data lines 102A that corresponds to the port being granted access to the bus 102. Upon being granted access to the bus 102, the designated port then has control of the bus 102.

Packet flow through the multi-port bridge occurs in the following manner. A data packet, such as an IEEE, 802.3 data packet, originating from a node (source node) in a segment of the local area network is received by a corresponding one of the ports 104–112 (source port) of the switch engine 100 (FIG. 3). The receive buffer 316 in the source port receives the data packet as the packet is being received by the transceiver 308 in the source port from the network segment associated with the source port. After the first twelve bytes, corresponding to the source address and the destination address for the packet, are received by the source port, the receive finite state machine 312 requests a look-up cycle from the bus control module 114 (FIG. 3) by raising the interrupt line IRQ. The bus control module 114 monitors such requests, discovers the requesting port(s) via the poll-interrupt command 05 H and grants each request according to an appropriate priority via the bus-grant-for IRQ command 14 H, as explained above.

Upon obtaining access to the bus, the source port places a look-up command 03 H (Table 1) on the control lines 102B. During successive clock cycles while the look-up command 03 H is active, an identification of the source port, the destination node address from the packet and the source node address from the packet are transferred from the source port to the look-up control module 120 (FIG. 3) via the data lines 102A. The source port identification, destination address and source address are transferred over the communication bus 102 in segments that are each four bytes long as this corresponds to the width (32 bits) of the data lines 102A of the communication bus 102. Preferably, this transfer is completed in four clock cycles. It will be apparent, however, that the communication bus 102 can have a different number of data lines, in which case, a different number of bytes can be transferred at a time.

Once the look-up control module 120 has received the source port identification, the destination address and the source address for the packet, the look-up control module 120 so notifies the memory control module 118 (FIG. 3). The memory control module 118 and look-up control module 120 then update the look-up tables 204 (FIG. 3) by ensuring that the source node address for the packet is stored in the look-up tables 204 in association with the source port identification for the packet. This ensures that the look-up tables 204 accurately reflect any changes that may have occurred in the network (this is referred to as a learning cycle). The information stored during the learning cycle is utilized for directing subsequent packets.

The memory control module 118 and the look-up control module 120 also utilize the look-up tables 204 to determine which port (destination port) is associated with the destination address for the packet. If the packet is a multi-cast packet (multiple destination ports) or a broadcast packet (all ports except the source port are destination ports), the look-up control module 120 will determine which are the multiple destination ports for the packet. Once the look-up cycle is complete, the look-up control module 120 places a look-up ready command 08 H (Table 1) on the control lines 102B of the bus 102. The look-up cycle and the learning cycle arc described in more detail herein with reference to FIGS. 6–11.

Figure 6:
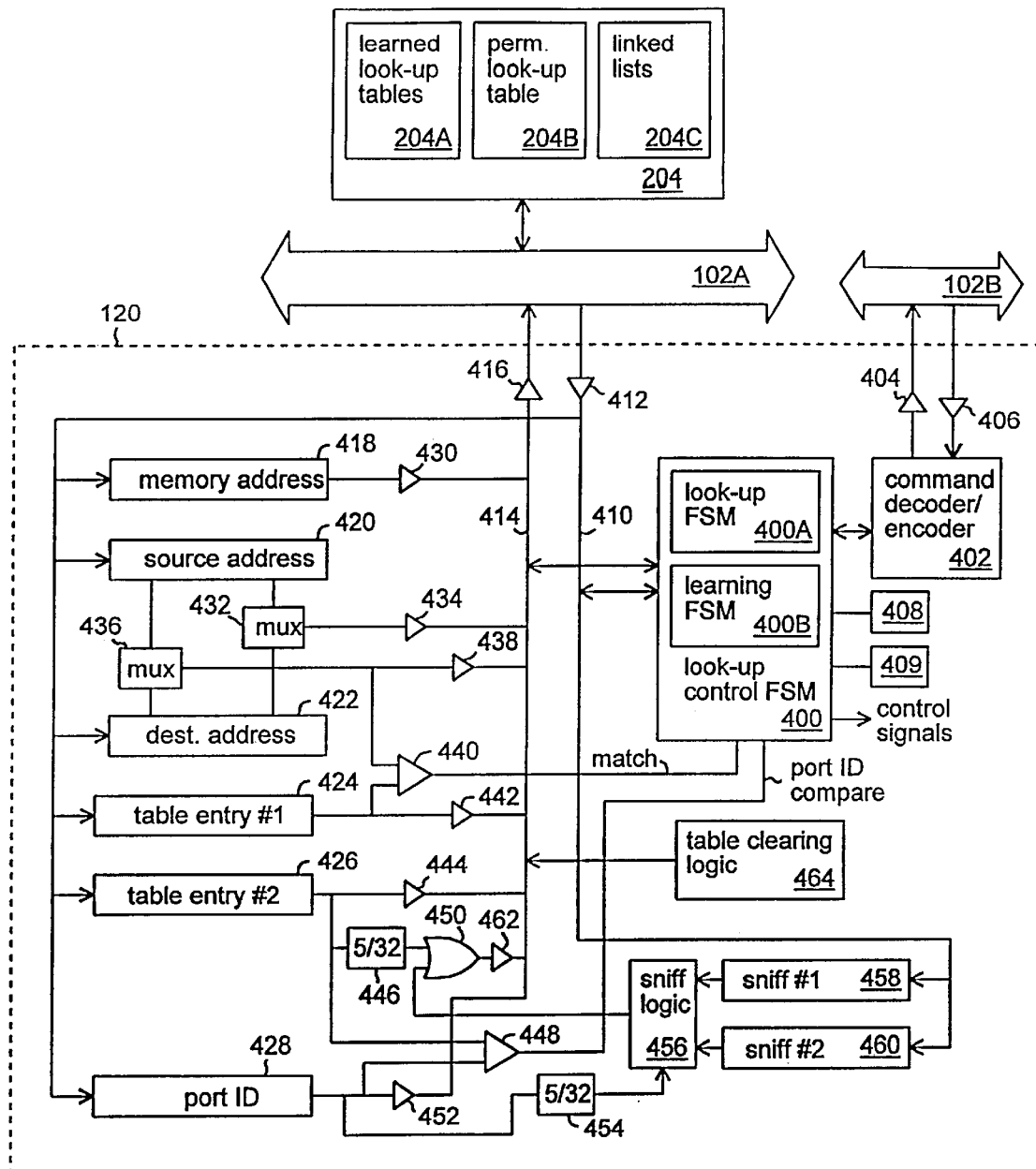
FIG. 6 illustrates a block schematic diagram of the look-up control module, data lines 102A, control lines 102B and look-up tables 204, according to the present invention.

FIG. 6 illustrates a block schematic diagram of the look-up control module 120 (FIG. 3), data lines 102A (FIG. 4), control lines 102B (FIG. 4) and look-up tables 204 (FIG. 3) according to the present invention. As illustrated in FIG. 6, the look-up tables 204 include learned look-up tables 204A, a permanent look-up table 204B and linked lists 204C. The look-up control module 120 includes a look-up control FSM 400 having a look-up FSM 400A and a learning FSM 400B. The look-up control module 120 also includes a command decoder/encoder 402 coupled to the control lines 102B via buffers 404, 406. The command decoder/encoder 402, a VLAN status register 408 and a rotating table status register 409 are each coupled to the lock-up control FSM 400. In addition, the look-up control module 120 includes a 32-bit wide data-in bus 410 coupled to the data lines 102A via a buffer 412 and a 32-bit wide data-out bus 414 coupled to the data lines 102A via a buffer 416.

A memory address register 418, a source address register 420, a destination address register 422, a table entry #1 register 424, a table entry #2 register 426 and a port ID register 428 are each coupled to receive data from the data-in bus 410. The memory address register 418 is coupled to provide memory address data to the data-out bus 414 via a buffer 430. A first multiplexor 432 is coupled to the source address register 420 and to the destination address register 422 four providing the least significant sixteen bits of an address stored in either the register 420 or the register 422 to the data-out bus 414 via a buffer 434. A second multiplexor 436 is coupled to the source address register 420 and to the destination address register 422 for providing the most significant 31 bits from either the register 420 or the register 422 to the data-out bus 414 via a buffer 438.

In addition, the multiplexor 436 is also coupled to provide the most significant 31 bits from either the source address register 420 or the destination address register 422 to a first, 31-bit, input of a comparator 440. The table entry #1 register 424 is also coupled to provide the 31 most significant bits of its contents to a second, 31-bit, input of the comparator 440 and to the data-out bus 414 via a buffer 442. An output of the comparator 440 forms a match signal which is provided to the look-up control FSM 400. The match signal is indicative of whether the values applied to the inputs of the comparator 440 are equal.

The table entry #2 register 426 is coupled to provide its contents to the data-out bus 414 via a buffer 444. The table entry #2 register 426 is also coupled to provide its most least significant bits to a 5-to-32 decoder 446 and to a first, 5-bit, input of a comparator 448. An output of the decoder 446 is coupled to a first, 32-bit, input of a logic OR gate 450. The port ID register 428 is coupled to provide its contents to a second, 5-bit, input of the comparator 448, to a 5-to-32 bit decoder 450 and to the data-out bus 414 via a buffer 452. An output of the comparator 448 forms a port ID compare signal which is provided to the look-up control FSM 400. The port ID, compare signal is indicative of whether the values applied to the inputs of the comparator 448 are equal.

An output of the decoder 454 is coupled to a sniff port logic circuit 456. The sniff port logic circuit 456 is coupled to receive the contents of a sniff port #1 register 458 and coupled to receive the contents of a sniff port #2 register 460. An output of the sniff port logic circuit 456 is coupled to a second, 32-bit, input of the logic OR gate 450. An output of the logic OR gate 450 is a 32-bit value which is a result of a bit-by-bit logic OR operation performed on the 32-bit values applied to its respective inputs. The output of the logic OR gate 450 is coupled to the data-out bus 414 via a buffer 462.

A table clearing logic circuit 464 is coupled to the data-out bus 414 for initiating a clearing operation for portions of the look-up tables 204 at appropriate times.

The look-up control FSM 400 generates a number of control signals which are appropriately coupled for controlling portions of the look-up control module 120, including each of the registers 418, 420, 422, 424, 426, 428, 456, 458 and each of the buffers 404, 412, 416, 430, 434, 438, 442, 444, 452, 462. To avoid unnecessarily complicating FIG. 6, however, the details of these control connections are not shown.

Figure 7:
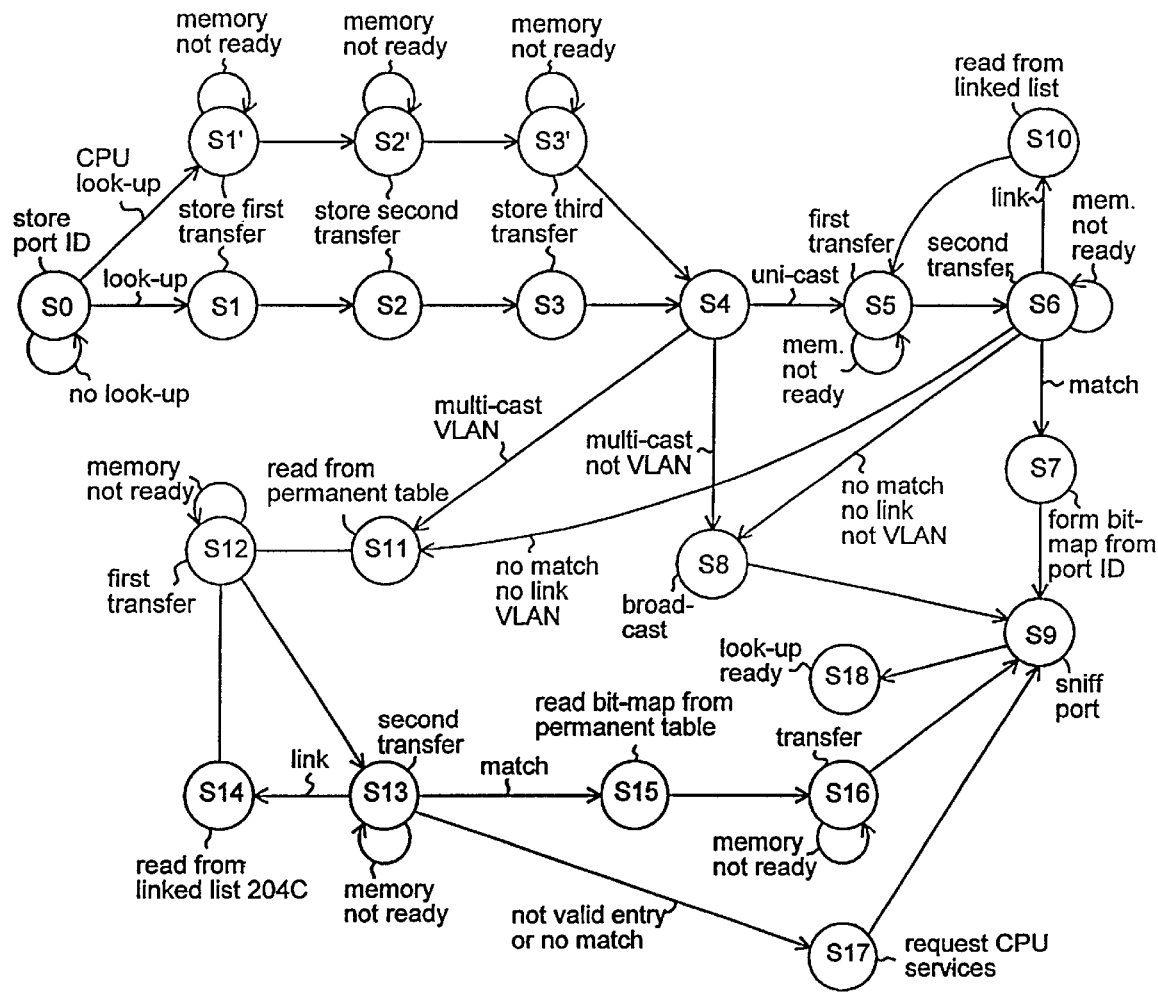
FIG. 7 illustrates a state diagram for the look-up FSM according to the present invention.
Figure 8:
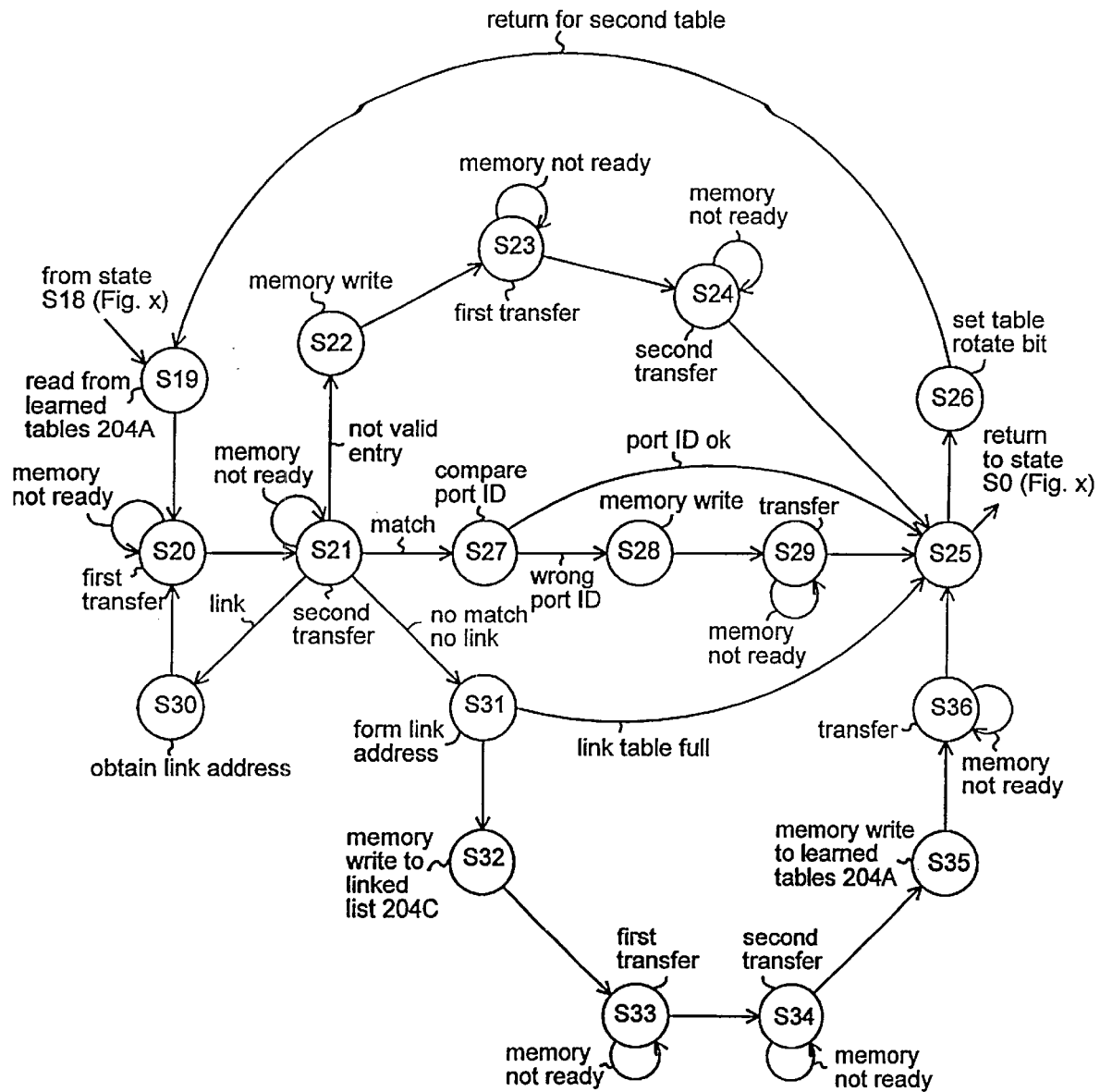
FIG. 8 illustrates a state diagram for the learning FSM according to the present invention.

FIG. 7 illustrates a state diagram for the look-up FSM 400A, while FIG. 8 illustrates a state diagram for the learning FSM 400B. For each packet received by the multi-port bridge according to the preferred embodiment of the present invention, the look-up FSM 400A is activated to identify the destination port or ports for the packet, and, then the learning FSM 400B is activated to update the learned look-up tables 204A and linked lists 204C. It will be apparent, however, that the learning FSM 400B could be activated before the look-up FSM 400A is activated.

Referring to FIGS. 6 and 7, the look-up FSM 400A is initially in an idle state S0 where it remains until a look-up command 03 H or a look-up command 09 H (for initiating a look-up cycle for an incoming packet) is received from the data lines 102B by the command decoder/encoder 402. The look-up command 03 H is generated by a port 102–112 (source port) that is receiving the incoming packet, while the look-up command 09 H is generated when the external processor 600 (FIG. 13) originates a packet. From Table 1, it can be seen that during the look-up command 03 H, the source port identification is placed on the data lines 102A. In the preferred embodiment, the port identifications are each a 5-bit value, one unique value for each port 102–112. During the look-up command 09 H, the identification (e.g. identified by 5 bits as a port #0) of the external processor 600 (FIG. 13) is placed on the data lines 102A. If the look-up command 03 H is received in the state S0, the identification of the source port is stored in the port ID register 428. Alternately, if the look-up command 09 H is received in the state S0, the port identification stored in the port ID register 428 identifies the external processor 600.

Figure 1:
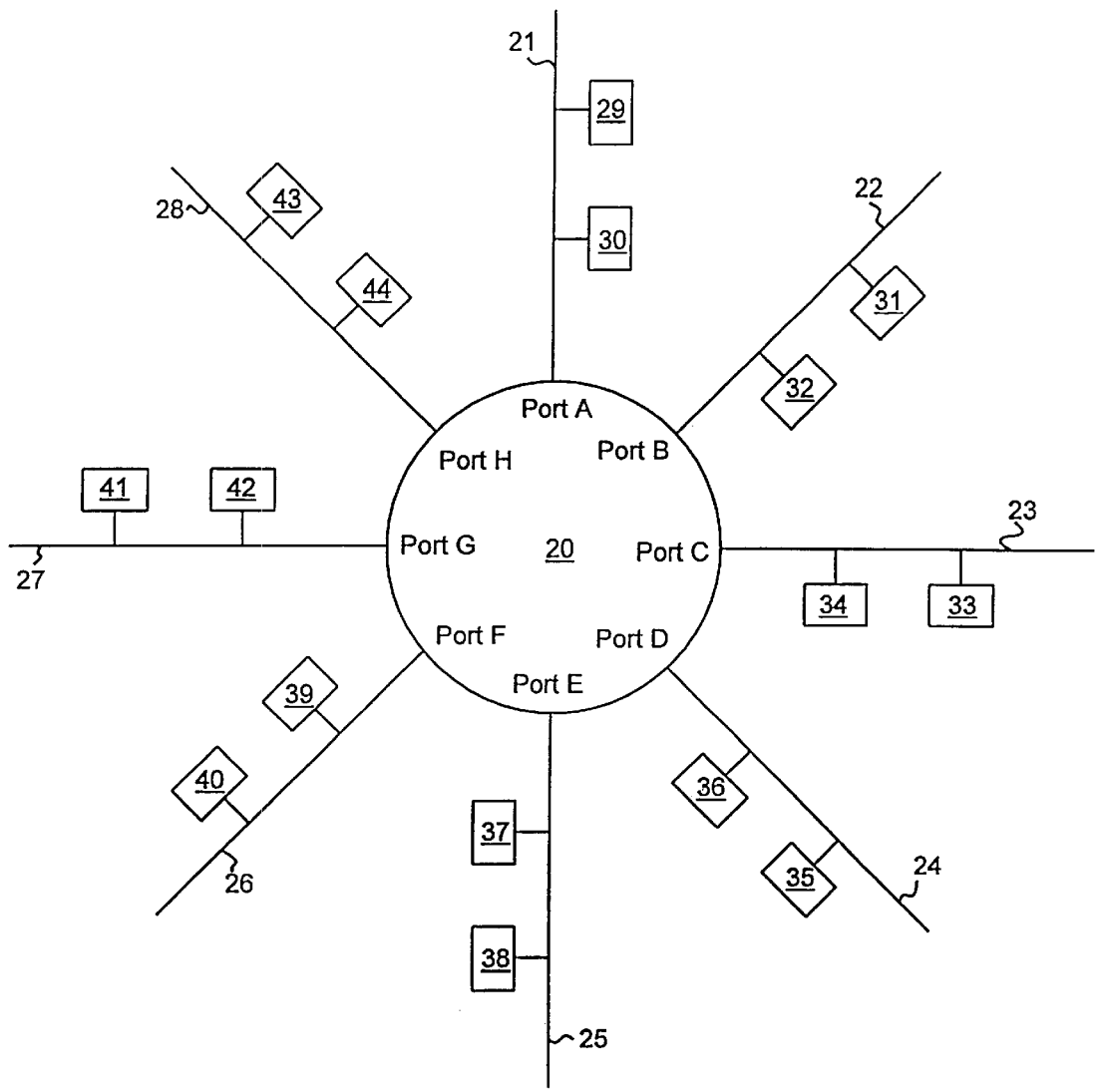
FIG. 1 illustrates a conventional local area network (LAN) including a multi-port bridge.
Figure 2:
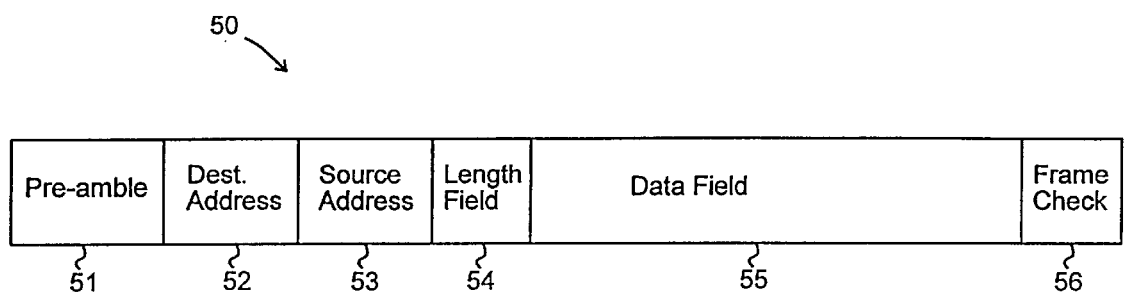
FIG. 2 illustrates a conventional IEEE 802.3 data packet.

Assuming the look-up command 03 H is received in the state S0, then the look-up FSM 400A moves from the state S0 to a state S1. Recall that the destination address field 52 (FIG. 2) and source address field 53 (FIG. 2) included in an IEEE 802.3 data packet 50 (FIG. 2) are each six-bytes (48 bits) long, while in the preferred embodiment of the present invention, the data lines 102A of the bus 102 (FIG. 4) are 32 bits wide. Accordingly, in the state S1 (and during the look-up command 03 H), a first transfer of 32 bits of the destination address for the incoming packet is received from the data lines 102A via the data-in bus 410 and is loaded into the destination address buffer 422. Then, the look-up FSM 400A moves to a state S2. In the state S2, a second transfer which includes the last 16 bits of the destination address and a first 16 bits of the source address for the packet is received from the data bus 102B via the data-in bus 410. The last 16 bits of the destination address are loaded into the destination address register 422 and the first 16 bits of the source address are loaded into the source address register 420. Then, the look-up FSM 400A moves to a state S3. In the state S3, a third transfer, which includes the last 32 bits of the source address for the packet, is received and stored in the source address register 420. The states S1, S2 and S3 all occur during the look-up command 03 H. Then, the look-up FSM 400A moves from the state S3 to a state S4.

Alternately, if the command received in the state S0 is a look-up command 09 H, this indicates that the packet originates from the external processor 600. In which case, the source and destination addresses for the packet are retrieved from the memory device 200, rather than being provided by one of the ports 102–112. Therefore, the look-up control module 102 must wait until the MEMRDY line 102E is pulsed before accepting data from the data lines 102A.

Accordingly, if the command received in the state S0 is a look-up command 09 H, the look-up FSM 400A moves from the state S0 to the state S1'. In the state S1' (and during the look-up command 09 H), when the MEMRDY line 102E is pulsed, a first transfer of 32 bits of the destination address for the incoming packet is received from the data lines 102A via the data-in bus 410 and loaded into the destination address buffer 422. Then, the look-up FSM 400A moves to a state S2'. In the state S2', when the MEMRDY line 102E is pulsed, a second transfer which includes the last 16 bits of the destination address and a first 16 bits of the source address for the packet is received from the data bus 102B via the data-in bus 410. The last 16 bits of the destination address are loaded into the destination address register 422 and the first 16 bits of the source address are loaded into the source address register 420. Then, the look-up FSM 400A moves to a state S3'. In the state S3', when the MEMRDY line 102E is pulsed, a third transfer, which includes the last 32 bits of the source address for the packet, is received and stored in the source address register 420. The states S1', S2' and S3' all occur during the look-up command 09 H. Then, the look-up FSM 400A moves from the state S3' to the state S4.

Thus, once the look-up FSM 400A reaches the state S4, via the states S1, S2 and S3 or the states S1', S2' and S3', the source port identification, destination address and source address for the incoming packet are stored in the look-up control module 120.

The least significant bit (termed multi-cast control bit) within the six-byte-long source address field 53 (FIG. 2) of each data packet 50 indicates whether the packet 50 has a single destination node (uni-cast packet) or multiple destination nodes (multi-cast or broadcast packet). For example, if the least significant bit of the source address is a logic one, this indicates that the packet has a single node as its destination node (uni-cast packet). Otherwise, if the least significant bit of the source address is a logic zero, the packet is intended for multiple destination nodes (broadcast or multi-cast packet).

Assuming the packet is an uni-cast packet, the switch engine 100 directs the packet to the appropriate one of the ports (destination port) coupled to the network segment which includes the destination node. The destination port is identified when the look-up FSM 400A performs a step of comparing the destination address contained in the data packet to entries stored in the look-up tables 204 during learning cycles performed by the learning FSM 400B for prior packets. The portion of the look-up tables 204 utilized for appropriately directing uni-cast packets is illustrated in FIG. 6 as the learned look-up tables 204A.

Assuming the packet is a multi-cast or broadcast packet (if the least significant bit of the source address is a logic zero), this indicates that the packet has multiple destination nodes that are to receive the packet. In such case, one of two possible responses is taken by the look-up FSM 400A depending upon whether or not the switch engine 100 is configured in a virtual local area network mode (VLAN mode). According to the preferred embodiment, a bit (VLAN control bit) stored in the VLAN status register 408 is selectively conditioned to indicate whether or not the switch engine 100 is in the VLAN mode. For example, when the VLAN control bit is logic one, this indicates that the switch engine 100 is in the VLAN mode and, when the VLAN control bit is a logic zero, this indicates that switch engine 100 is not in the VLAN mode.

The VLAN mode allows nodes of a LAN to be arranged in groups. For example, a group can include all the workstations in a particular department of an organization. When one of the nodes within the group sends a packet, where the least significant bit of the source address included in the packet is a logic zero and the switch engine 100 is in the VLAN mode, the packet is a multi-cast packet. The switch engine 100 delivers the multi-cast packet to all of the members of the group to which the source node belongs. For such a multi-cast packet, the destination ports for the packet are identified by comparing the remaining 47 bits of the source address to entries stored in a permanent table 204B within the look-up tables 204, illustrated in FIG. 6. Each destination port for such a packet is coupled to a LAN segment including one or more members of the group. Accordingly, the bit-map of the destination ports placed on the bus 102 during the look-up ready command 08 H for the packet identifies each port that is coupled to a LAN segment that includes one or more members of the group.

When the multi-cast control bit within the source address field of a data packet indicates that the packet has more than one destination node and the VLAN control bit stored within the switch engine 100 indicates that the switch engine 100 is not in the VLAN mode, the packet is a broadcast packet. The switch engine 100 directs each broadcast packet to all the ports 104–112 of the multi-port bridge, (or to all ports other than the source port) for transmission to each segment of the LAN. Accordingly, the bit-map of the destination ports placed on the bus 102 during the look-up ready command 08 H for the packet identifies all the ports as destination ports for the packet.

To facilitate the following explanation of operation of the look-up FSM 400A, it is helpful to first explain how the data is stored in the learned look-up tables 204A by the learning FSM 400B. As mentioned, however, in the preferred embodiment, for each packet, the look-up FSM 400A is active before the learning FSM 400B is active. Therefore, the learning cycle for each packet begins after the look-up cycle is complete.

Because the source address includes a 47-bit-long node address (plus the multi-cast control bit), there is a large number ($2^{47}$) of possible node addresses. For this reason, the learned look-up tables 204A are preferably implemented as a content addressable memory (CAM) device or implemented as a random access memory (RAM) configured to emulate a CAM device. In the preferred embodiment, the look-up tables 204 are included in the memory device 200. The memory device 200 is preferably an SDRAM device (a type of RAM device). Accordingly, the learned look-up tables 204A are preferably implemented as a RAM device configured to emulate a CAM device. This is accomplished by utilizing a mathematical technique (termed hashing) of mapping a larger set of numbers into a smaller set.

The learning FSM 400B preferably performs a hashing algorithm on each address before the address is stored in the look-up tables 204A along with a corresponding port identification. The hashing algorithm preferably removes the most significant bits of each address and retains the least significant bits unchanged, though it will be apparent that another hashing algorithm could be used. Preferably, the sixteen least significant bits are retained such that there are $2^{16}$ (65,536) possible addresses after hashing. Therefore, the look-up tables 204A preferably include at least 65,536 memory locations.

The remaining 31 bits (remaining after the sixteen least significant bits and the multi-cast control bit are removed) of the source address for each packet, the identification of the source port for the packet, and an entry valid/not valid control bit, are each stored in a location of the look-up tables 204A specified by the first 16 bits of the source address. The entry valid/not valid control bit indicates whether or not the data at the location is valid for use in directing packets. Prior to storing any data in the look-up tables 204A, all the entries in the tables 204A are preferably cleared such that the valid/not valid control bit for each entry location indicates that the corresponding data is invalid. When the identification of a source port for a packet is stored in an entry location, the valid/not valid control bit is then changed to indicate that the data is valid.

Figure 9:
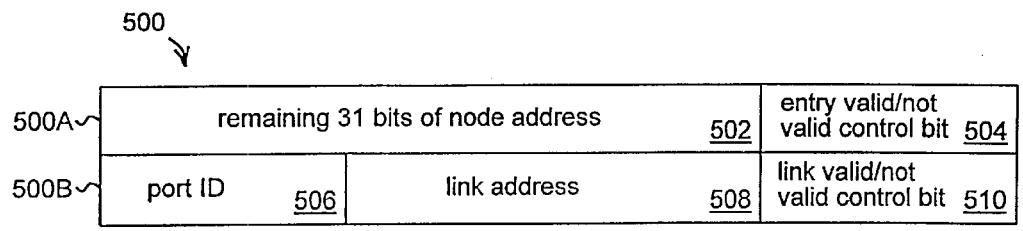
FIG. 9 illustrates a single entry location in the learned look-up tables according to the present invention.

FIG. 9 illustrates a single entry location 500 in the learned look-up tables 204A. In the preferred embodiment, the entry location 500 includes two consecutive, 32-bit, memory locations. Thus, each entry includes two 32-bit words of data. The first 32-bit location 500A includes a 31-bit field 502 for storing the remaining 31 bits of the node address (the portion removed by the hashing algorithm) and a one-bit field 504 for storing the entry valid/not valid control bit. The second 32-bit location includes a 5-bit field 506 for storing the port identification, a 26-bit field 508 for storing a link address and a one-bit field 510 for storing a link valid/not valid control bit. Though the link address can be up to 26 bits long, not all of these bits are needed to specify the link address.

In preferred embodiment, the learned look-up tables 204A include three sub-tables where entries are made (learning cycles) in each of the sub-tables in an appropriate sequence. Thus, during a first period of time, entries are made in first and second sub-tables; entries are made during a second period of time in the second and third sub-tables; and entries are made during a third period of time in the first and third sub-tables. The sub-tables are utilized for directing packets (look-up cycles) in an appropriate sequence. Accordingly, during the first period of time, the first sub-table is utilized for directing packets; during the second period of time, the second sub-table is utilized for directing packets; and during the third period of time, the third sub-table is utilized for directing packets. In addition, the sub-tables are periodically cleared in an appropriate sequence. Thus, at the end of the first period of time, the third table is cleared; at the end of the second period of time, first table is cleared; and at the end of the third period of time, the second table is cleared. After the third period of time, these sequences repeat. According to this technique, the entries in the learned look-up tables 204A are updated to reflect any changes in the LAN to which the multi-port bridge is coupled. It will be apparent, however, that a single look-up table can utilized. For such an embodiment, the single look-up table is preferably updated by periodically removing entries in the table as each entry becomes older than a predetermined amount of time.

Referring now to FIG. 8, the learning cycle for each packet begins in a state S19. The S18 is the last state of the look-up FSM 400A. In the state S19, the learning FSM 400B initiates a read operation from a location in the learned look-up tables 204A identified by the sixteen least significant bits of the source address for the incoming packet.

These sixteen bits are the result of hashing the source address. The read operation is performed, via the memory read command 01 H, using a memory address placed in the memory address register 418.

To form the memory address, the sixteen least significant bits of the source address for the incoming packet are obtained from the source address register 420 and placed in the memory address register 418 via the multiplexor 432 and buffer 434. Because each entry 500 (FIG. 9) is stored in two consecutive, one-word, locations 500A and 500B, the memory read command 01 H indicates that two memory transfers are to be performed, one for each word. Accordingly, a zero is appended to the sixteen bits of the source address stored in the memory address register 418 to form the least significant bit of the memory address. In addition, seven bits are appended to form the most significant bits of the memory address. These seven bits identify a portion of the memory device 200 dedicated to the learned look-up tables 204A. When three sub-tables are utilized for the learned look-up tables 204A, these seven bits identify the appropriate sub-table. Accordingly, the memory address for the read command 01 H is 24 bits long, as in Table 1.

Once the number of memory transfers and memory address from the memory address register 418 are placed on the data lines 102A and the read command 01 H is placed on the data lines 102B, the learning FSM 400B moves from the state S19 to a state S20. In the state S20, the first of the two memory transfers requested in the state S19 is received and placed in the table entry #1 register 424. Then, the learning FSM 400B moves to a state S21. In the state S21, the second of the two memory transfers is received and placed in the table entry #2 register 426.

In the state S21, the entry valid/not valid control bit stored in the table entry #1 register 424 is checked. If the entry is not valid according to the entry valid/not valid bit, this indicates that the incoming packet is the first packet sent by the source node since a clearing operation in the learned look-up tables 204A cleared a prior entry for the source node. In which case, the learning FSM 400B moves from the state S21 to a state S22. In the state S22, a write operation is initiated in order to place a valid entry in the learned look-up tables 204A for the source node. The memory address, including the sixteen least significant bits of the source address, utilized for the read operation initiated in the state S19 is utilized for this write operation. The number of transfers is two. The learning FSM 400B then moves from the state S22 to a state S23.

In the state S23, a first transfer is performed. In this first transfer, the 31 most significant bits of source address from the source address register 420 is transferred into the field 502 of the appropriate entry location 500A in the learned look-up tables 204A. In addition, the entry valid bit in the field 504 is set to indicate that the entry is now valid. Then, the learning FSM 400B moves from the state S23 to a state S24.

In the state S24, a second transfer is performed. In this second transfer, the port identification of the source port from the port ID register 428 is transferred into the field 506 in the successive memory location 500B in the learned look-up tables 204A. Then, the learning FSM moves from the state S24 to a state S25.

In the state S25, the rotating table status register 409 is checked. If the data stored within the status register 409 indicates that two sub-tables within the learned look-up tables 204A are to be conditioned for each packet, and that the second sub-table has not yet been appropriately conditioned, then the learning FSM 400B moves from the state S25 to the state S26. In the state S26, the contents of the rotating table status register 409 are changed to indicate that the second table is appropriately conditioned for the incoming packet. Then, the learning FSM 400B returns to the state S19. Starting again in the state S19, the learning FSM 400B conditions the second sub-table within the learning look-up tables 204A for the incoming packet. For this conditioning, the seven bit address appended to the sixteen least significant bits of the source address identifies a portion within the learned look-up tables 204A dedicated to the second sub-table.

Otherwise, if in the state S25, if the rotating table status register 409 indicates that only one sub-table is to be conditioned for each incoming packet, or if the second of two sub-tables has already been conditioned for the incoming packet, then the learning operation for the incoming packet is complete. In such case, the learning FSM 400B moves from the state S25 to the state S0 (FIG. 7) to await a next look-up command 03 H or 09 H.

Alternately, if in the state S21 (FIG. 8), the entry valid/not valid control bit stored in the table entry #1 register 424 (from the field 504) indicates that the entry is valid, then the remaining 31 bits of the source address for the packet (stored in the register 420) are compared to the remaining 31 bits stored in the table entry #1 register 424. To perform this comparison, the 31 bits of source address stored in the source address register 420 are coupled to the first input of the comparator 440 via the multiplexor 436, while 31 bits of the address from the field 502 stored in the table entry #1 register 424 are coupled to the second input of the comparator 440.

If the comparator 440 indicates a match, this indicates that the retrieved table entry was conditioned when a prior packet was sent by the same source node as the incoming packet. In such a case, the learning FSM 400B moves from the state S21 to a state S27. In the state S27, the port identification of the current packet is compared to the port identification stored in the entry location (from field 506) of the look-up tables 204A. This comparison is performed by coupling the port identification stored in the table entry #2 register to the first input of the comparator 448 and coupling the port identification from the port ID register 428 to the second input of the comparator 448.

If the comparator 448 indicates that the port identifications are not the same, this indicates that the configuration of the LAN has changed and, in response, the port identification for the entry needs to be updated. In such case, the learning FSM moves from the state S27 to a state S28. In the state S28, a memory write operation is initiated. For this memory write operation, the memory address stored in the memory address register 418 is utilized, except that the least significant bit (appended in the state S19) is changed from a zero to a one. This causes the write operation to be performed only on the second word 500B of the entry location. Accordingly, the number of transfers is changed to one. Then, the learning FSM 400B moves to from the state S28 to a state S29.

In the state S29, a transfer of the port identification is performed. This replaces the incorrect port identification stored in the field 506 with the port identification stored in the port ID register 428. The port identification from the register 428 is coupled to the data-out bus 414 via the buffer 452. Then, the learning FSM 400B moves from the state S29 to the state S25. From the state S25, the learning FSM moves to the state S26 or to the state S0 (FIG. 7), as appropriate.

Alternately, if in the state S27, the comparator 448 indicates that the port identifications are the same, then the port identification does not need to be updated as this indicates that the LAN configuration has not recently changed. In which case, the states S28 and S29 are skipped and the learning FSM 400B moves from the state S27 to the state S25. From the state S25, the learning FSM moves to the state S26 or to the state S0 (FIG. 7), as appropriate.

Alternately, if in the state S21, the comparator 440 indicates that there is not a match between the remaining 31 bits stored at the entry location and the remaining 31 bits of the source address for the packet, this indicates that a second node (the source node of the current packet) has the same first 16 bits in its node address as a first node (the source node of a prior packet) having its node address already stored in the look-up tables 204A. While such a situation is possible, it is generally not expected to occur often. In such case (when there is not a match between the remaining 31 bits from the source address included in a packet and the 31 bits stored in the look-up tables 204A at the location found using the first 16 bits of the source address), an appropriate linked entry is required in the linked lists 204C.

The linked lists 204C are an allocated portion of the memory device 102. The linked lists 204C include a entry for each node in the LAN determined to share the same first 16 bits of its respective node address with another node in the LAN.

Figure 10:
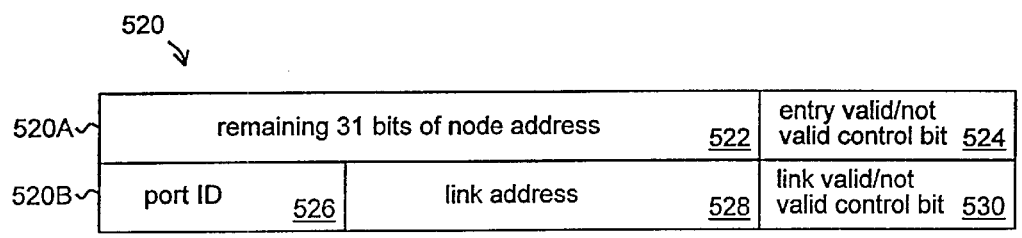
FIG. 10 illustrates a single linked entry in the linked lists according to the present invention.

FIG. 10 illustrates a single linked entry 520 in the linked lists 204C. In the preferred embodiment, the linked entry 520 is stored in two consecutive, 32-bit, memory locations. Thus, each entry includes two 32-bit words of data. The first 32-bit location 520A includes a 31-bit field 522 for storing the remaining 31 bits of the node address (the portion removed by the hashing algorithm) and a one-bit field 524 for storing an entry valid/not valid control bit. The second 32-bit location includes a 5-bit field 526 for storing a port identification, a 26-bit field 528 for storing a link address and a one-bit field 530 for storing a link valid/not valid control bit. In the preferred embodiment, fields of the linked entry 520 have a one-to-one correspondence with the fields of the entry location 500. This is advantageous because it allows certain states of the learning FSM 400B to be simplified regardless of whether an entry location 500, or a linked entry 520, is being conditioned. (The same is true of the look-up FSM 400A . . . )

Accordingly, in the state S21, if the comparator 440 does not indicate a match, the valid/not valid bit (from the field 510) stored in the table entry #2 register 426 is checked to determine if a linked entry has already been formed. If the link valid/not valid bit from the field 510 indicates that a linked entry has already been formed, then the learning FSM 400B moves from the state S21 to a state S30. In the state S30, a read operation is initiated to obtain the linked entry from the linked lists 204C via the read command 01 H.

Thus, in the state S30, the link address (from the field 508 of the entry location 500) is obtained from the table entry #2 register 426 and placed in the memory address register 418. The memory read command 01 H indicates that two memory transfers are to be performed, one for each word of the linked entry 520. Accordingly, a zero is appended to the sixteen bits of the source address stored in the memory address register 418 to form the least significant bit of the memory address. In addition, seven bits are appended to form the most significant bits of the memory address. These seven bits identify a portion of the memory device 200 dedicated to the linked lists 204C. Thus, the memory address for the read command 01 H is 24 bits long, as in Table 1.

Then, the learning FSM 400B moves from the state S30 to the state S20. In the states S20 and S21, the learning FSM 400B obtains the contents of the linked entry 520, rather than the contents of the entry location 500, as previously described relative to the states S20 and S21. The learning FS14 400B then continues as described above.

If, in the state S21, the link valid/not valid bit indicates that a linked entry has not already been formed, an appropriate linked entry needs to be added to the linked lists 204C. In which case, rather than moving to the state S30, the learning FSM 400B moves from the state S21 to a state S31. In the state S31, a link address is formed in the linked lists 204C. This address is the address of a next available link entry location 520 in the linked lists 204C. Therefore, according to the preferred embodiment, the link addresses are assigned in sequential order as needed.

If it is determined in the state S31 that there are no more available link entry locations 520, then the learning FSM 400 indicates a link error and moves from the state S31 to the state S25.

Assuming there is an available link entry location 520, the learning FSM 400B moves from the state S31 to a state S32. In the state S32, a write operation is initiated, via the write command 02 H, utilizing the link address formed in the state S31. For this write operation, the number of transfers is two. Then, the learning FSM moves from the state S32 to a state S33.

In the state S33, a first transfer is made to the appropriate memory location 520A in the linked lists 204C. The first transfer places the remaining 31 bits of node address from the source address register 420 into the field 522 and changes the entry valid/not valid bit in the field 524 to indicate that the entry is valid. Then, the learning FSM 400B moves to from the state S33 to a state S34.

In the state S34, a second transfer is made to the next consecutive memory location 520B. The second transfer places the port identification stored in the port ID register 428 into the field 526. Then, the learning FSM 400B moves from the state S34 to a state S35.

In the state S35, a memory write operation is initiated in the learned look-up tables 204A, via the memory write command 02 H. The purpose of this memory write operation is to place the link address for the linked entry in the link address field 508 of the entry location 500B and to change the link valid/not valid control bit in the field 510 to indicate that the link is valid. Because only the memory location 500B need be accessed, the number of transfers for this write operation is one. The memory address is formed in the memory address register 418 and includes the sixteen least significant bits of the source address stored in the source address register 420. A logic one appended to form the least significant bit of the memory address to identify the location 500B while an appropriate seven bit value is appended to form the most significant bits of the memory address. Then, the learning FSM moves from the state S35 to a state S36.

In the state S36, the link address for the link entry is placed in the field 508 and the link valid/not valid bit in the field 510 is updated to indicate that the link is valid. Then, the learning FSM moves from the state S36 to the state S25.

In the preferred embodiment, in the event that more than two nodes share the same least significant sixteen bits of their respective node addresses, one or more additional levels of linking are implemented by the learning FSM 400B. This is accomplished when the states previously described utilize the link address field 528 and link valid/not valid field 530 (FIG. 10). In such case, these fields are accessed in the state S30 and conditioned in the state S36.

This completes the functions of the learning FSM 400B relative the incoming packet. Returning to the look-up FSM 400 illustrated in FIG. 8, in the state S4, the look-up FSM 400A determines whether the least significant bit (multi-cast control bit) of the source address indicates that the packet is a uni-cast packet or whether the packet is intended for multiple destination nodes (multi-cast or broadcast packet).

Assume that in the state S4, the packet is determined to be a uni-cast packet. In such case, the FSM 400A moves to a state S5. In the state S5, the look-up FSM 400A initiates a read operation in the learned look-up tables 204A via a memory read command 01 H. The read operation utilizes the sixteen least significant bits of the destination address stored in the destination address register 420. The look-up FSM 400A obtains these sixteen bits of the destination address via the multiplexor 436 and places them into the memory address register 418. Because each entry 500 (FIG. 9) is stored in two consecutive locations 500A and 500B, the memory read command 01 H indicates that two transfers are to be performed and a zero is appended to the sixteen bits of the destination address stored in the memory address register 418 to form the least significant bit of the memory address. In addition, seven bits are appended to form the most significant bits of the memory address. These seven bits identify the learned look-up tables 204A within the memory device 200 (or the appropriate sub-table within the learned look-up tables 204A).

The result of the read operation is two memory transfers, each transfer including 32-bits of data. The look-up FSM 400A remains in the state S5 until the first transfer is received and then stored in the table entry #1 register 424. Thus, the register 424 stores the remaining 31-bits of node address from the field 502 of the table entry 500 and also the entry valid/not valid bit from the field 504. Then, the look-up FSM 400A moves to a state S6.

In the state S6, the second transfer is received and stored in the table entry #2 register 426. The second transfer includes the destination port identification from the field 506, any link address from the field 508 and the link valid/invalid control bit from the field 510. Thus, contents of the registers 424 and 426 reflect the contents of the appropriate table entry locations 500A and 500B, respectively.

Then, in the state S6, the entry valid/not valid control bit is checked via the buffer 430. In addition, the remaining 31 bits stored in the table entry #1 register 424 are compared to the corresponding 31 bits of the destination address stored in the destination address register 422. This comparison is performed via the multiplexor 436 and comparator 440. If the entry is valid and the comparator 440 indicates a match, the port identification stored in the table entry #2 register 426 is the identification of the appropriate destination port for the packet. Accordingly, the look-up FSM 400A then moves to a state S7.

Figure 12:
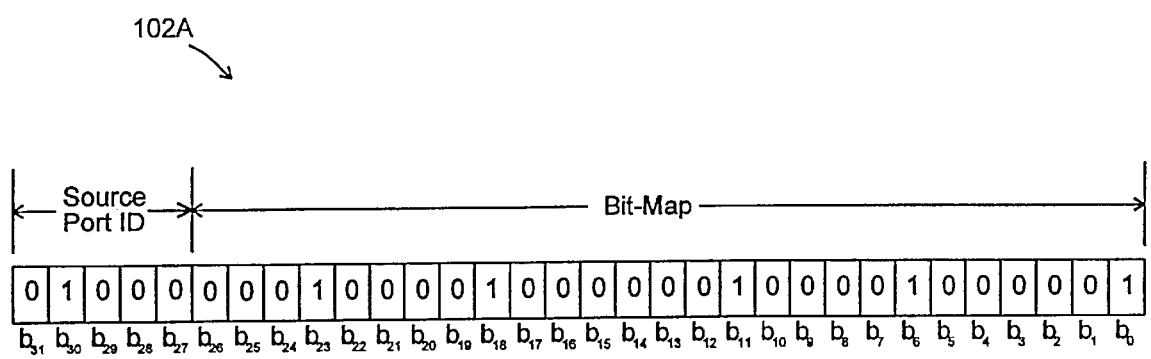
FIG. 12 illustrates a bit-map of the destination ports appearing on the high speed communication bus during a look-up ready command according to the present invention.

In the state S7, the port identification stored in the table entry #2 register 426 is provided to the 5-to-32 it decoder 446. The 5-to-32 it decoder 446 converts the port identification to an appropriate bit-map (FIG. 12). From the state S7, the look-up FSM 400A moves to a state S9.

In the preferred embodiment, the switch engine is selectively configured to provide one or more sniff ports. A sniff port is one the ports 102–112 (FIG. 3) selected to duplicate the activity of another one of the ports. Such a sniff port is provided for troubleshooting and network management purposes. The switch engine 100 is configured to provide a sniff port via a code stored in the sniff #1 register 458 or sniff #2 register 460. If the switch engine 100 is configured to provide a sniff port, then the packet may also need to be transmitted by the sniff port. The identification of the source port for the incoming packet stored in the port ID register 428 is provided to the 5-to-32 decoder 454. The decoder 454 provides a bit-map where the signal line corresponding to the source port for the packet is raised. Sniff port logic 456 utilizes the bit-map provided by the decoder 454 and the contents of the registers 458 and 460 to determine if a sniff port is to transmit the packet in addition to the destination port identified by the bit-map provided by the 5-to-32 decoder 446. If so, the sniff port logic 456 provides the bit-map of the sniff port to the second input of the logic OR gate 450. The output of the logic OR gate 450 is a bit-map which identifies the destination port found from the learned look-up tables 204A and the also the sniff port.

Then, the look-up FSM 400A moves from the state S9 to a state S18. In the state S18, the look-up ready command 08 H is placed on the control bus 102B while the bit-map of the destination ports obtained from the output of the logic OR gate 450 is placed on the data bus 102A via the buffer 462.

Alternately, assume that in the state S6, the table entry is determined to be valid, but the comparator 440 does not indicate a match. In such case, the link valid/not valid control bit stored in the table entry #1 register 426 is checked via the buffer 442. If the link valid/not valid control bit indicates a valid link, a read operation is required to obtain the linked entry from the linked lists 204C. Accordingly, the look-up FSM 400A moves from the state S6 to a state S10. In the state S10, the link address (from the field 508) is obtained from the table entry #2 register 426 via the buffer 444 and is placed in the memory address register 418 by the look-up FSM 400A. Because each linked entry location 520 includes two memory locations 520A and 520B, a zero is appended to the link address to form the least significant bit of the memory address. In addition, a value is appended to form the most significant bits of the memory address. The appended value identifies the portion of the memory 200 dedicated for the linked lists 204C.

Then, the look-up FSM 400A returns to the state S5 where the memory read operation is initiated via the memory read command 01 H. For this memory read command 01 H, the number of transfers is two and the memory address is obtained from the register 418. The look-up FSM 200A remains in the state S5 until the first transfer from the linked lists 204C is received and loaded into the table entry #1 register 424. Then, the look-up FSM 400A moves to the state S6 where the second transfer from the linked lists 204C is received and loaded into the table entry #2 register 426. In the state S6, the 31 bits of node address from the field 522 in the linked lists 204C is compared to the remaining 31 bits stored in the destination address register 422 by the comparator 440. If a match is indicated, the look-up FSM 400A continues from the state S6 to the state S7, as described above.

If no match is found in the state S6, but the link valid/not valid control bit stored in the table entry #1 indicates that there is a next level link, the look-up FSM 400A continues from the state S6 to the state S10. This process of moving among the states S5, S6 and S10 continues until a match is found between the remaining 31 bits or until the link valid/not valid bit indicates that there is no next level link.

If no match is found in the state S6 before all the linked entries (if any) are exhausted, the look-up FSM 400A then determines if the switch engine 100 is configured in the VLAN mode according to the VLAN control bit stored in the VLAN status register 408.

If the switch engine 100 is not configured in the VLAN mode, the packet is treated as a broadcast packet to ensure that the destination node for the packet receives the packet. Accordingly, the look-up FSM 400A moves from the state S6 to a state S8. In the state S8, the look-up FSM 400A prepares a bit-map (FIG. 6) which identifies all of the ports 102–112 (or all of the ports except the source port) as destination ports for the packet. The look-up FSM 400A then moves to the state S9 and to the state S18. As mentioned, in the state S18, the look-up ready command 08 H is placed on the control bus 102B while the bit-map of the destination ports for the broadcast packet is placed on the data bus 102A.

If the switch engine 100 is configured in the VLAN mode, however, the packet is treated as a multi-cast packet. In which case, the permanent table 204C is utilized to direct the packet to all the members of the group to which the source node belongs. Accordingly, the look-up FSM 400A moves from the state S6 to a state S11.

Recall that in the state S4, the look-up FSM 400A determines whether the least significant bit (multi-cast control bit) of the source address indicates that the packet is a uni-cast packet or whether the packet is intended for multiple destination nodes (multi-cast or broadcast packet).

Assume that in the state S4, the packet is determined to be a multi-cast or broadcast packet. In which case, the VLAN control bit is checked to determine whether or not the switch engine 100 is conditioned in the VLAN mode. If the switch engine 100 is not conditioned in the VLAN mode, the look-up FSM 400A moves from the state S4 to the state S8. As described above, the packet is then broadcast to all the ports (or all the ports other than the source port).

Alternately, if the switch engine 100 is conditioned in the VLAN mode, the permanent table 204C is utilized to direct the packet to all the members of the group to which the source node belongs. Accordingly, the look-up FSM 400A moves from the state S4 to the state S11.

Figure 11:
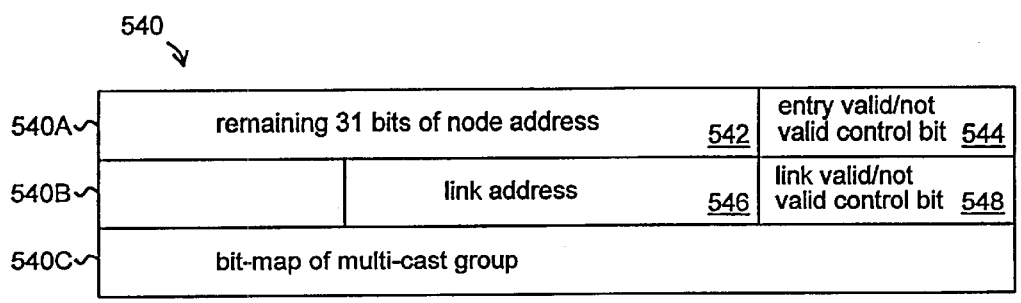
FIG. 11 illustrates a single table entry for the permanent tables according to the present invention.

FIG. 11 illustrates a single table entry 540 for the permanent tables 204C. In the preferred embodiment, the table entry 540 includes three consecutive, 32-bit, memory locations 540A, 540B and 540C. Thus, each entry includes three 32-bit words of data. The first 32-bit location 540A includes a 31-bit field 542 for storing the remaining 31 bits of the source node address and a one-bit field 544 for storing an entry valid/not valid control bit. The second 32-bit location 540B includes a field 546 for storing a link address and a one-bit field 548 for storing a link valid/not valid control bit. The link address specifies a location within the linked lists 204C (or within the permanent tables 204B) which is utilized to a store table entry 540 in the event that two or more nodes belonging to a VLAN group (or groups) share the same least significant bits of their respective node addresses. The third 32-bit location 540C includes a bit-map of destination ports that are coupled to the other nodes included in the VLAN group to which the source node belongs.

Figure 13:
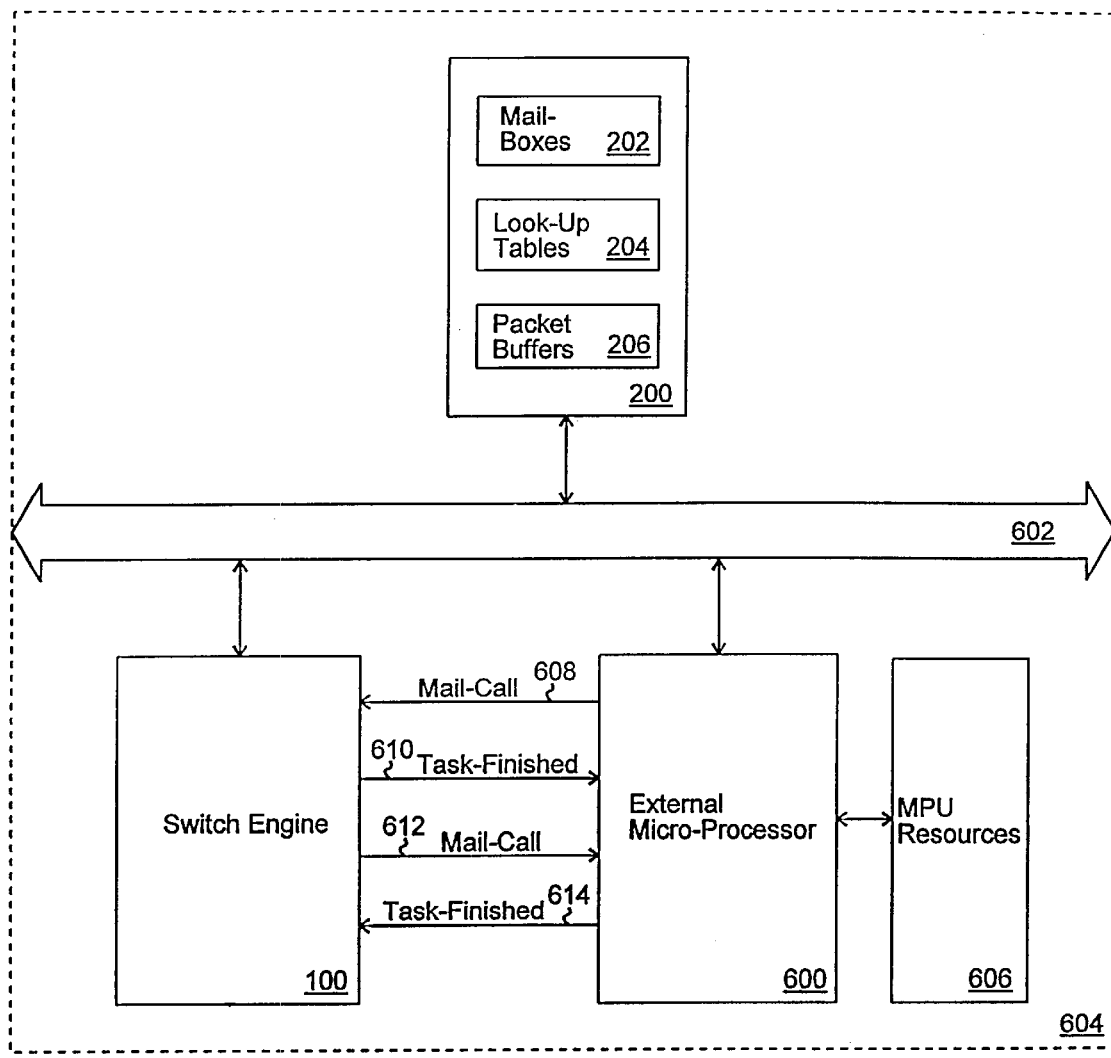
FIG. 13 illustrates a block schematic diagram of the switch engine, a memory device and an external processor according to the present invention.
Figure 14:
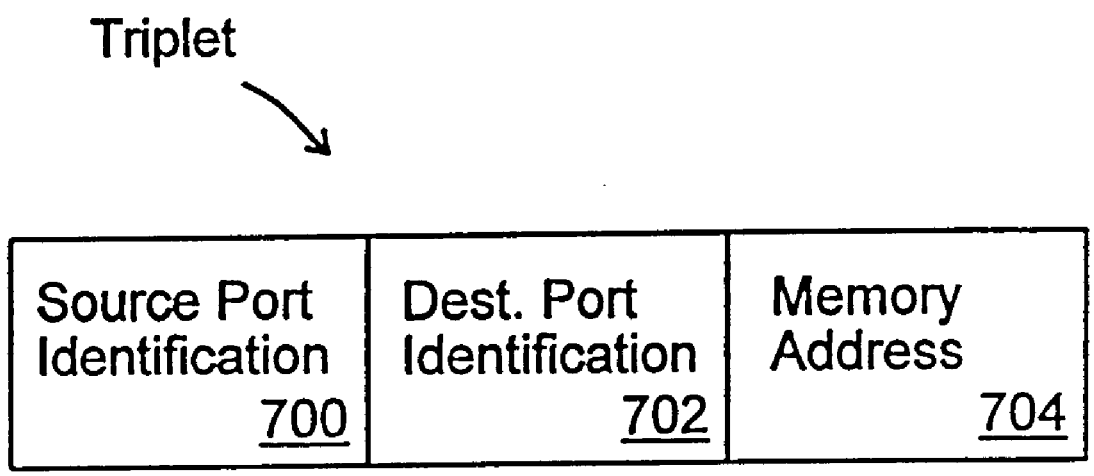
FIG. 14 illustrates a "triplet" according to the present invention, including a first field containing an identification of a source port, a second field containing an identification of a destination port, and a third field containing a memory address.

The contents of the permanent table 204B are preferably initialized by the external processor 600 (FIG. 13). Each entry in the permanent table 204B includes a bit-map of the destination ports (FIG. 12) for a multi-cast packet (identifying all the destination ports for the packet) stored in association with the source node address for the packet. The bit-map of the destination ports is placed on the bus 102 during the look-up ready command 08 H for the packet.

Referring now to FIG. 7, in the state S11, the look-up FSM 400A obtains the sixteen least significant bits of the source address for the packet from the source address register 420 via the buffer 442 and places these sixteen bits in the memory address register 418. In addition, a zero is appended to the sixteen bits to form the least significant bit of the memory address and a seven bit value is appended to form the most significant bits of the memory address. The appended value identifies the portion of the memory 200 dedicated for the permanent table 204B.

Then, the look-up FSM 400A moves from the state S11 to a state S12 where a memory read operation is initiated via the memory read command 01 H. For this memory read command 01 H, the number of transfers is two and the memory address is obtained from the register 418. The look-up FSM 200A remains in the state S12 until the first transfer from the permanent table 204B is received and loaded into the table entry #1 register 424. The first transfer includes the fields 542 and 544 (FIG. 11).

Then, the look-up FSM 400A moves from the state S12 to a state S13 where the second transfer from the linked lists 204C is received and loaded into the table entry #2 register 426. The second transfer includes the fields 546 and 548 (FIG. 11).

In the state S13, if the entry valid/not valid bit (field 544) from the entry 540 of the permanent table 204B indicates that the entry is valid, the remaining 31 bits obtained from the field 542 are compared to the remaining 31 bits of the source address for the packet. To accomplish this, the most significant 31 bits of the source node address stored in the source address register 420 are coupled to the first input of the comparator 440, via the multiplexor 436, and the 31 bits of node address obtained from the permanent table 204B (now stored in the table entry #1 register 426) are coupled to the second input of the comparator 440.

If the entry is determined to be valid in the state S13, but the comparator 400 does not indicate a match, the look-up FSM 400A moves from the state S13 to a state S14. In the state S14, the link address is obtained from the field 546 and placed in the memory register 418 along with appended values to form the appropriate memory address. Then, a memory read operation is initiated via the memory read command 01 H utilizing the memory address stored in the memory address register 418. The look-up FSM 400A then moves from the state S14 to the state S12 and continues as before. This process of moving among the states S12, S13 and S14 continues until a match is found between the remaining 31 bits or until the link valid/not valid bit indicates that there is no next level link.

If the comparator 400 indicates a match in the state S13, the look-up FSM 400A moves from the state S13 to a state S15. In the state S15 another read operation is initiated to obtain the bit-map stored in the location 540C (FIG. 11) of the permanent table 204B. For this read operation, the seven-but value appended to the memory address stored in the memory address register 418 is incremented by one and the number of memory transfers is two. Then, the look-up FSM 400A moves from the state S15 to a state S16. In the state S16, the bit-map is received into the table entry #1 register 424. Then, the look-up FSM moves from the state S16 to the state S9 and to the state S18. In the state S18, the bit-map stored in the table entry #2 register 424 is coupled to the data-out bus 414 via the buffer 442 during the look-up ready command 08 H.

Assuming that in the state S13, an invalid entry is encountered in the permanent tables 204B, or if an entry is encountered in the permanent tables 204C does not indicate a match and that does not identify a linked entry, this indicates an error condition (a multi-cast miss). In which case, the external processor 600 (FIG. 13) is utilized to rectify this condition. Accordingly, the look-up FSM 400A moves from the state S13 to a state S17. In the state S17, the look-up control module 120 requests services from the external processor 600 via the MPU port and mailbox module 116 (FIG. 3). From the state S17, the look-up FSM moves to the state S9 and S18.

While the look-up ready command 08 H is active in the state S18, the look-up control module 120 raises the respective signal lines of the data lines 102A of all the ports 104–112 which are determined to be destination ports for the packet. One signal line each corresponds uniquely with one of the ports 104–112.

This raising of the respective signal lines is referred to as a bit-map of the destination ports. FIG. 12 illustrates logic levels for each of the thirty-two data lines 102A, of the bus 102 during the look-up ready command 08 H. Each one of the twenty-six ports 104–112 and the external processor 400 are assigned to a respective one of the signal lines $b_0$–$b_{31}$. Thus, for example, the external processor 400 is assigned to signal line $b_{26}$, while port #1 is assigned to signal line $b_0$, port #2 is assigned to signal line $b_1$, port #3 is assigned to signal line $b_2$, and so forth, with port #26 assigned to signal line $b_{25}$. In the preferred embodiment, signal lines $b_{27}$–$b_{31}$ are not included in the bit-map. Rather, the signal lines $b_{27}$–$b_{31}$ identify the source port. A multi-port bridge, however, could include more or fewer ports, in which case, the bit assignments would be different.

Assume that the look-up cycle for a packet having port #9 as its source port determines that the packet is multi-cast having destination nodes associated with destination ports #1, #7, #12, #19 and #24. Therefore, during the look-up ready command 08 H, the bit-map of the destination ports will include logic one's for signal lines $b_0$, $b_6$, $b_{11}$, $b_8$ and $b_{23}$; signal lines $b_{27}$–$b_{31}$ identify port #9 as the source port; and the remaining signal lines $b_1$–$b_5$, $b_7$, $b_9$–$b_{10}$, $b_{12}$–$b_{17}$, $b_{19}$–$b_{22}$ and $b_{24}$–$b_{26}$ are logic zeros.

Each port monitors the communication bus 102 for the look-up ready command 08 H appearing on the control lines 102B and the associated bit-map of the destination ports appearing on the data lines 102A. The bit-map allows each destination port for the packet to be simultaneously notified of its status as a destination port. If the source port for the packet is also designated as the only destination port for the packet during the look-up ready command 08 H, this indicates that the destination node for the packet is in the same network segment as the source node (intra-segment communication). As such, the source port should not retransmit the packet because the destination node would have already received the packet at the same time that the source port received the packet. When this occurs and the packet has a single destination, the packet is filtered. To filter the packet, the source port preferably takes no further action relative to the packet.

If any destination port having its signal line raised during the look-up ready command 08 H has a memory pointer buffer 306 that is full or nearly full, such destination port raises the JAM REQ line 102D (FIG. 4) while the look-up ready command 08 H is still active. During the look-up ready command 08 H, the source port monitors the JAM REQ line 102D for such a jam request. In response to a jam request, the source port discards the incoming packet and also sends a jam signal over its associated segment. The jam signal will cause the node (source node) which is the source of the packet to discontinue sending the packet and attempt to resend the packet after a waiting period.

Once the look-up ready command 08 H is no longer active, the source port for the packet places a bus-release command 0F H (Table 1) on the control lines 102B of the data bus 102. This releases control of the bus 102 by indicating to the bus control module 114 that the bus is available.

The bus control module 114 then responds to any pending interrupts or requests for access to the bus 102 by granting access to the bus in an appropriate priority. Thus, while the packet is still being received by the source port, but after the determination is made whether to filter or jam the incoming packet, the bus 102 can be utilized for other purposes.

Meanwhile, returning the example, the packet continues being received by the source port. Once 64 bytes of the packet have been received, the source port requests access to the bus again, this time by raising the REQ line 102F. The bus control module 114 grants access to the source port in an appropriate priority by placing a bus-grant-for-REQ command 04 H on the control lines 102B and raises the signal line corresponding to the source port.

The packet buffers 206 include a space allocated to each port for storing packets received by the port. Each port controller 300 keeps track of the space allocated to the port and determines a location in the packet buffers 206 for each packet received by the port. Preferably, the packets are written into the allocated space in a circular fashion; each new packet overwrites portions of the oldest packet in the allocated space.

The source port initiates a series of memory write cycles for loading the packet from the receive buffer 316 of the source port into the allocated space in the packet buffers 206 by first placing a new packet transfer command 10 H (Table 1) on the control lines 102B and by placing the bit-map for the destination ports on the data lines 102A (raising the signal lines corresponding to each destination port for the packet). If any destination port having its signal line raised during new packet transfer command 10 H is not currently busy transmitting or receiving another packet, such destination port configures itself to receive the packet directly from the source port (cut-through). Destination ports that are currently busy ignore the packet for now and retrieve the packet from the packet buffers 206 later, when they are no longer busy.

Following the new packet transfer command 10 H, the source port places a memory write command 02 H (Table 1) on the control lines 102B of the bus 102. During a first bus clock cycle while the memory write command 02 H is active, the source port places on the data lines 102A one byte of information which indicates the number of bus cycles which will be required to complete the entire transfer. The number of bus cycles depends upon how much of the packet was received in the source port while the source port awaited access to the bus 102. Also during the first bus clock cycle while the memory write command 02 H is active, the source port places on the data lines 102A three bytes of information which indicates a starting address within the packet buffers 206 for the memory write cycles. The memory control module 118 receives this information for performing the memory write operation.

Simultaneously with the writing of the packet into the memory buffers 206, each destination port configured for cut-through receives the packet directly from the bus 102 into its transmit FIFO 318 and immediately begins transmitting the packet to the appropriate destination node on its associated network segment under control of its transmit finite state machine 314. The destination node for the packet then begins to receive the packet from the network segment.

In subsequent bus clock cycles while the memory write command 02 H is active, the source port places the packet on the data lines 102A in four byte portions (corresponding to the width of the data lines 102A), one portion for each clock cycle, until the memory write operation is completed. Simultaneously, destination ports configured for cut-though continue to receive the packet and continue to transmit the packet to their associated network segment. When the memory write operation is completed, the source port releases the bus via the bus-release command 0F H.

Once the next 64 bytes of the packet is received by the source port, the source port again requests access to the bus 102 by raising the REQ line 102F and initiates a next memory write operation for loading the packet into the packet buffers 206. The source port first places a continuation packet transfer command 11 H (Table 1) on the control lines 102B and, while the continuation packet command 10 H is active, the source port places the bit-map for the destination ports on the data lines 102A (raises the signal lines corresponding to each destination port for the packet). Only those destination ports having their signal lines raised and that had already been receiving the packet directly from the source port (those destination ports configured for cut-through) will continue to receive the next installment of the packet directly from the source port. Other destination ports will continue to ignore the packet. This is true even if a destination that was busy during the new packet transfer command 10 has become available because such a port would not have obtained the first installment of the packet. Then, the source port places the memory write command 02 on the data lines 102A and places one byte of information indicating the number of bus cycles required and three bytes indicating the starting address for this write operation. Then, the port releases the bus via the bus-release command 0F H. This process repeats, including requesting access to the bus and placing the continuation packet transfer command 10 H on the bus 102, for each successive 64 byte portion of the packet until the entire packet is loaded into the packet buffers 206. Because writing of the packet in the packet buffers 206 preferably occurs as the remainder of the packet is still being received into the receive buffer 316 of the source port, the receive buffer 316 for each port need not be capable of storing an entire data packet.

The packet is preferably loaded into the packet buffers 206 a predetermined offset from an assigned starting address. This provides a location for storing a header for the packet once the packet has been completely loaded into the packet buffers 206. For example, the header includes an identification number assigned to the packet, an indication of the destination ports for the packet, the receive status for the packet, the length of the packet, the source node address for the packet and the destination node address for the packet. The receive status indicates whether or not the entire packet has been successfully received and loaded into the packet buffers 206. Preferably, the header is eight bytes long, though it will be apparent that another length can be selected for the header.

Once the entire packet has been stored in the packer buffers 206, the source port obtains access to the bus 102 and, then, stores the header for the packet in the packet buffers 206 by placing a packet header command 12 H on the control lines 102B. During a first clock cycle while the packet header command 12 H is active, the source port places one byte of information indicating the number bus clock cycles required to write the entire header into the memory buffers 206 and places three bytes of information indicating the assigned starting address for the packet. During successive bus clock cycles, the header is written into the packet buffers beginning at the assigned starting address.

Each port monitors the communication bus 102 for the packet header command 12 H. While the packet header command 12 H is active, each port receives the packet header information. Each port which is identified as a destination port in the packet header checks the receive status for the packet and, if the packet was successfully received and stored in the packet buffers 306, the destination port stores at least the assigned starting address for the packet in its memory pointer buffer 306. Preferably, the destination port also stores the identification number assigned to the packet in the memory pointer buffer 306 along with the assigned starting address for the packet. If the receive status indicates an error, however, the starting address in the packet buffers is not stored and no further action is taken by the destination ports relative the packet. Finally, the source port releases control of the bus 102 via the bus release command 0F H. This completes the actions taken by the source port relative the packet.

Each port monitors its memory pointer buffer 306 and initiates retrieval of packets from the packet buffers 206. Thus, returning to the example packet, as soon as the destination port becomes available, it removes the identification number for the packet and the assigned starting address for the packet from its memory pointer buffer 306. Then, the destination port requests access to the bus by raising the request line REQ. Once the bus control module grants access to the bus 102, via the bus-grant-for-REQ command 04 H, the destination port first retrieves the header for the packet from the packet buffers 206. Thus, the destination port initiates a read operation by placing a memory read command 01 (Table 1) on the control lines 102B of the bus 102. During a first clock cycle while the memory read command 01 H is active, the destination port places on the data lines 102A of the bus 102 one byte of information indicating the number of bus clock cycles for the read operation (e.g. the number of transfers required to retrieved the header) and three bytes of information indicating the assigned starting address for the packet.

Once the packet header is retrieved from the packet buffers 206, the destination port checks the packet identification number that is included in the header retrieved. If the packet identification number retrieved from the packet buffers 206 does not match the packet identification number stored in the memory pointer buffer 306, this indicates that the packet became corrupted in the packet buffers 306 after it was stored. For example, if a portion of the packet was overwritten by a later packet, the identification number will also be overwritten, such that it does not match the identification number stored in the memory pointer buffer 306 of the destination port. In addition, the destination port obtains the length of the packet so that it can determine the appropriate number of memory read cycles that will be required to transfer the entire packet.

While the destination port is retrieving the packet from the packet buffers 206, the destination port simultaneously transmits the packet to its associated segment under control of the transmit finite state machine 314. For this reason, the transmit FIFO 318 in each port need not be capable of storing more than a single packet of the maximum length. Preferably, the packet is retrieved from the packet buffers 206 in multiple installments until the entire packet has be retrieved from the packet buffers 206. An installment is initiated each time the transmit FIFO 318 is nearly empty. Each installment is retrieved by the destination port obtaining access to the bus 102; placing a memory read command 01 H on the bus 102 while specifying a number of memory transfers required for the installment; and releasing the bus via the bus release command 0F H after performing the specified number of transfers. Accordingly, the transmit FIFO 318 preferably need not be capable of storing a packet of maximum length. Because the bus 102 is released between installments, other ports can access the bus for other purposes simultaneously with the destination port transmitting the packet to its associated network segment.

In the event that a cut-through or transmit operation was initiated, but was unsuccessful, the packet will need to be retransmitted by the destination port. For example, the cut-through or transmit operation may have been unsuccessful if a data collision occurred during transmission of the packet over the segment associated with the destination port. In such case, the packet is retrieved from the packet buffers 206 as described above and re-transmitted by the destination port.

While the destination port is receiving the packet into its transmit buffer 318 from the packet buffers 206, the destination port begins transmitting the packet to the LAN segment associated with the destination port. The packet is then received from the network segment by the destination node for the packet.

Thus, if the destination port is configured for cut-through, the destination port will receive the packet into its transmit buffer 318 directly from the communication bus 102 simultaneously with the write cycles for loading of the packet into the packet buffers 206. During such a cut-through operation, the packet is received into a transmit buffer 318 of the destination port for immediate transmission to the LAN segment associated with the destination port. If the packet is a broadcast or multi-cast packet, one or more of the destination ports can receive the packet directly from the source port, while one or more other destination ports for the packet can retrieve the packet from the packet buffers 206 once those destination ports are no longer busy.

FIG. 13 illustrates a block schematic diagram of the switch engine 100, the memory device 200 and an external processor 600 according to the present invention. A memory bus 602 interconnects the switch engine 100 and the external processor 600 to the memory device 200. Preferably, access to the memory device 200 by the switch engine 100 and the external processor 600 is implemented by a multiplexor included as part of the memory bus 602 and which multiplexor is controlled by the switch engine 100. The switch engine 100, including the communication bus 102 (FIG. 3), is preferably implemented as an integrated circuit mounted to a printed circuit board 604. The memory device 200 and the external processor 600 are also mounted to the printed circuit board 604.

As described above in reference to FIGS. 3–5, the bridging and filtering functions of the multi-port bridge are performed primarily by the switch engine 100 and the buffer memory 200. Because the switch engine 100 is preferably implemented as a number of finite state machines interconnected via the communication bus 102, the switch engine 100 provides a high bandwidth capacity for directing data packets through the multi-port bridge. Thus, according to the present invention, the external processor 600 is provided to perform tasks in support of the functioning of the switch engine 100. These functions include: providing a communication port for enabling the nodes of the LAN to communicate with nodes of a dissimilar LAN or a WAN and for enabling the nodes of the LAN to communicate with a file server for the LAN; providing parameters for initializing registers of the switch engine via a register load command 0C (Table 1); collecting data from the LAN for performing network management functions via a register read command 0D (Table 1); and providing services to the switch engine 100, such as to redress a multi-cast miss. The mailbox interface according to the present invention allows the external processor 600 to provide these functions without the need to dedicate a large number of pins of the integrated circuit package to such an interface.

Preferably, the external processor 600 is implemented as a reduced instruction set computer (RISC) to improve speed performance. The external processor 600 can have its own dedicated resources 606, such as memory for storing operating software for the external processor 600 and for use by the external processor 600 as a scratch pad. In addition, when the external processor 600 performs the functions of a file server for the LAN, the resources 606 can include a mass storage device for storing application programs and data files which is accessible by the external processor 600. Also, when the external processor 600 performs the function of providing an interconnection of the LAN to a dissimilar LAN or to a WAN, the resources 606 can include a communication device, such as a telephone modem, an integrated services digital network (ISDN) interface, a T1 media interface or a T3 media interface which is accessible by the external processor 600. In addition, multiple external processors 600 can be coupled to the memory bus 602. In such case, additional resources can be provided for such multiple external processors, such as one or more mass storage devices and/or one or more communication devices.

When a packet is originated by the external processor 600, the destination address and source address for the packet are placed in the memory 200 by the external processor 600. Thus, rather than obtaining the destination and source addresses from the source port, the destination and source addresses are obtained from the memory 200. The memory control module 118 places a look-up gated with MEMRDY command 09 on the control lines 102B of the bus 102, retrieves the destination address and source address from the memory 200, and places them on the data lines 102A. As with the look-up command 03 H, transfer of the destination and source addresses is performed over several bus clock cycles. The look-up control module 120 responds to the look-up gated with MEMRDY command 09 by waiting until the MEMRDY line 102E is raised to a logic high voltage level before beginning to receive the destination and source addresses for performing a look-up cycle. This ensures that the destination and source addresses appearing on the data lines 102A are valid before the look-up control module 120 receives them.

In an alternate embodiment, the memory pointer buffer 306 of each port stores memory pointers, referred to as "triplets" for data packets being queued in the packet buffers 206 of the DRAM memory 200, rather than the memory pointers described above (having a packet identification number and memory starting address). FIG. 15 illustrates a "triplet" according to the present invention. Each triplet includes three fields: a first field 700 containing the identification of the source port, a second field 702 containing the identification of the destination port, and a third field 704 containing a starting address assigned to the incoming packet in the packet buffers 206.

As before, while a packet is being received by the source port, a look-up cycle is initiated by the source port to identify which is the appropriate destination port for the packet based upon the destination address. A result of performing the look-up for each packet, however, is a triplet. The starting address contained in the triplet is assigned by the memory control module 118. While the packet is being received by the source port, the memory control module 118 places an "initial" triplet on the data lines 102A of the communication bus 102 and places a corresponding initial triplet command on the control lines 102B. This is in contrast to placing the tit-map of the destination ports on the data lines 102A and placing the associated the look-up ready command 08 H on the control lines 102B, as described above.

The initial triplet is received by each port. If the source port and the destination port are the same, this indicates that the source and destination nodes are on the same segment of the LAN (intra-segment communication). The source port recognizes this condition and, in response, filters the packet.

If the port identified as the destination port in the triplet is not currently busy transmitting or receiving another packet, the destination port configures itself to receive the packet directly from the source port (cut-through). However, if the memory pointer buffer 306 in the port identified as the destination port in the triplet is nearly full, the bus controller 300 of the destination port raises the JAM REQ line 102D. The source port receives the jam request and, in response, discards the incoming packet and also sends a jam signal over its associated segment. The jam signal causes the node (source node) which is the source of the packet to discontinue sending the packet and attempt to resend the packet after a waiting period.

The packet is loaded from the receive buffer of the source port into the packet buffers 206 starting at the memory address identified by the third field of the triplet. As before, a predetermined offset provides a space for storing header information for the packet. Writing of the packet into the packet buffers 206 preferably occurs as the remainder of the packet is still being received into the receive buffer of the source port. For this reason, the receive buffer 316 for each port need not be capable of storing the entire data packet. In addition, if the destination port is configured for cut-through, the destination port will receive the packet into its transmit buffer 318 directly from the communication bus 102 simultaneously with the write cycles for loading, of the packet into the packet buffers 206. During such a cut-through operation, the packet is received into the transmit buffer 318 of the destination port and immediately transmitted to the LAN segment associated with the destination port.

Once the entire packet has been loaded into the packet buffers, the memory control module 118 places a "final" triplet on the data lines 102A of the communication bus 102 and places a corresponding final triplet command on the control lines 102B. It should be noted that the bit patterns for the initial triplet and for the final triplet are preferably identical, while the bit patterns placed on the command lines of the communication bus 102 for identifying each of the initial and final triplets are distinct. The destination port receives the final triplet and stores it in its memory pointer buffer 306. This is in contrast to placing the packet identification and assigned starting address in the memory pointer buffer, as described above. Thus, the packet is queued for transmission by the destination port.

Then, when the destination port is no longer busy, the destination port retrieves the packet from the packet buffers 206 by gaining access to the communication bus 102 and initiates a series of read operations over the communication bus 102 beginning at the starting address in the packet buffers 206 of the packet (from the third field of the triplet for the packet).

In both embodiments, the memory pointers stored in the memory pointer buffer 306 of each port are preferably of a uniform size. Therefore, the exact number of memory pointers that can be accommodated by a memory pointer buffer 306 of a port can be determined from the amount of space available in the memory pointer buffer 306 of the port. Accordingly, unlike prior arrangements, extra space does need to be provided in the port to accommodate a data packet having an unknown length. According to the present invention, however, the jam request (raising the JAM REQ line) is preferably generated by a destination port for a packet when the memory pointer buffer 306 in the port is nearly full, but has space available to store several memory pointers (e.g. ten). This provides the destination port an ability to store memory pointers for packets which are in the process of being loaded into the packet buffers 206. The memory pointer buffer 306 in each port is preferably sized relative to the associated packet buffers 206 in the memory device 200 such that there is only a small possibility that the packet buffers 206 will become full before any memory pointer buffer 306 becomes full. For example, because each port can hold up to 128 memory pointers, the packet buffers 206 can preferably accommodate 128 data packets of the maximum size for each port. In practice, the packet buffers 206 can be somewhat smaller because not every packet is expected to have the maximum size.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device of the present invention could be implemented in several different ways and the apparatus disclosed above is only illustrative of the preferred embodiment of the invention and is in no way a limitation.

What is claimed is:

1. A method of directing packets through a multi-port bridge for a local area network, the multi-port bridge for interconnecting a plurality of segments of a local area network, wherein each segment is associated with a corresponding port of the multi-port bridge and includes one or more nodes the method comprising steps of:
   (a) receiving a destination node address, a source node address and a source port identification for a current packet;
   (b) performing a learning cycle for the current packet wherein the learning cycle includes steps of:
      (1) hashing the source node address to form a hashed source address;
      (2) identifying a first storage location in a memory device based upon the hashed source address;
      (3) determining if an entry has been made at the first storage location and, when no entry has been made at the first storage location, storing the source port identification at the first storage location;
      (4) determining whether the entry made at the first storage location was made in response to a prior packet having a same hashed source address as the current packet and having a corresponding source node address that is dissimilar from the source node address of the current packet;
      (5) forming a linked entry at a fourth storage location wherein the linked entry includes the source port identification for the current packet; and (6) storing an address of the fourth storage location in the first storage location;
(c) performing a look-up cycle for the current packet wherein the look-up cycle includes steps of:
(1) determining whether the current packet is intended for multiple destination nodes or a single destination node;
(2) when the current packet is intended for multiple destination nodes, identifying a destination port for the current packet according to information obtained from a second storage location, wherein the second storage location is identified based upon the source node address; and
(3) when the current packet is intended for a single destination node, identifying the destination port for the packet according to information obtained from third storage location, wherein the third storage location is identified based upon the destination node address.

2. The method according to claim 1 wherein the step of performing the learning cycle further comprises a step of examining a link valid/not valid indicator in the first storage location, and when the link valid/not valid indicator does not indicate a valid link, performing steps of:
(1) forming a linked entry at a fourth storage location wherein the linked entry includes the source port identification for the current packet;
(2) storing an address of the fourth storage location in the first storage location further comprising a step of conditioning a link valid/not valid indicator in the first storage location to indicate a valid link; and
(3) conditioning the link valid/not valid indicator to indicate a valid link.

3. The method according to claim 1 wherein the step of performing the learning cycle and the step of performing the look-up cycle are both performed by a finite state machine.

4. The method according to claim 1 wherein the step of performing the learning cycle is performed while the current packet is still being received by the source port for the current packet.

5. The method according to claim 1 wherein the step of performing the look-up cycle is performed while the current packet is still being received by the source port for the current packet.

6. The method according to claim 1 wherein the step of performing the learning cycle and the step of performing the look-up cycle are both performed while the current packet is still being received by the source port for the current packet.

7. The method according to claim 6 wherein the step of performing the learning cycle is performed after the step of performing the look-up cycle is complete.

8. The method according to claim 1 wherein the step of performing the learning cycle is performed after the step of performing the look-up cycle is complete.

9. The method according to claim 1 wherein the information obtained from the second storage location includes a binary logic value for each port of the multi-port bridge wherein each binary logic value is indicative of whether the corresponding port is a destination port for the current packet.

10. The method according to claim 9 wherein the ports of the multi-port bridge are interconnected by a communication bus, the communication bus having a plurality of signal lines and wherein each port uniquely corresponds to one signal line of the communication bus and further wherein each binary logic value is applied to the corresponding signal line of the communication bus upon completion of the look-up cycle.

11. The method according to claim 10 wherein each binary logic value is representative of whether each destination port is associated with a node that is a member of a group to which the source node for the current packet belongs.

12. The method according to claim 1 wherein the information obtained from the third storage location includes an identification of the destination port for the current packet.

13. The method according to claim 12 wherein the identification of the destination port for the current packet is stored in the third storage location during a learning cycle performed for a prior packet.

14. A method of directing packets through a multi-port bridge for a local area network, the multi-port bridge for interconnecting a plurality of segments of a local area network, wherein each segment is associated with a corresponding port of the multi-port bridge and includes one or more nodes, the method comprising steps of:
a. receiving a destination node address, a source node address and a source port identification for a current packet;
b. performing a learning cycle for the current packet wherein the learning cycle includes steps of:
(1) hashing the source address thereby forming a hashed source address for the current packet;
(2) identifying a first storage location in a memory device based upon the hashed source node address;
(3) determining whether an entry has been made at the first storage location;
(4) when no entry has been made at the first storage location, storing the source port identification at the first storage location;
(5) when an entry has been made at the first storage location, determining whether the entry made at the first storage location was made in response to a prior packet having a same hashed source node address as the current packet and having a corresponding source node address that is dissimilar from the source address of the current packet; and
(6) when the entry made at the first storage location was made in response to a prior packet having a same hashed source node address as the current packet and having a corresponding source node address that is dissimilar from the source address of the current packet, performing steps of:
(a) forming a linked entry at a second storage location wherein the linked entry includes the source port identification for the current packet; and
(b) storing an address of the fourth storage location in the first storage location.

15. The method according to claim 14 wherein the step of determining whether an entry has been made at the first storage location includes a step of examining an entry valid/not valid indicator stored in the first storage location.

16. The method according to claim 15 wherein when no entry has been made at the first storage location, performing a step of conditioning the entry valid/not valid indicator to indicate that the entry is valid.

17. The method according to claim 14 wherein the step of performing the learning cycle is performed while the current packet is still being received by the source port for the current packet.

18. The method according to claim 14 wherein when the entry made at the first storage location was not made in response to a prior packet having a same hashed source node address as the current packet and having a corresponding source node address that is dissimilar from the source address of the current packet, performing steps of comparing a port identification stored at the first storage location to the port identification for the current packet, and when the comparison does not indicate a match, replacing the port identification stored at the first storage location with the port identification for the current packet.

19. The method according to claim 14 wherein the step of hashing the source node address includes a step of removing bits from the source node address and wherein the step of determining whether the entry made at the first storage location was made in response to a prior packet having a same hashed source node address as the current packet and having a corresponding source node address that is dissimilar from the source address of the current packet comprises a step of comparing the bits removed from the source address to a value stored at the first storage location and when the comparison does not indicate a match, performing the step of forming a linked entry.

20. An apparatus for directing packets through a multi-port bridge for a local area network, the multi-port bridge for interconnecting a plurality of segments of a local area network, wherein each segment is associated with a corresponding port of the multi-port bridge and includes one or more nodes, the apparatus comprising:

a. a communication bus coupled to each port of the multi-port bridge;

b. a memory device coupled to the communication bus wherein the memory device includes a look-up table including a plurality of table entries, each table entry associating a node address of one of the nodes of the local area network with a port identification of one of the ports of local area network;

c. a learning FSM for generating and updating the look-up table according to a hashed node address of the source address for each packet, a port identification of a port which receives the packet, a valid/not valid indicator, and an address of a linked table entry wherein the learning FSM accesses the look-up table via the communication bus;

d. a look-up FSM for utilizing the look-up table to identify an appropriate destination port for each packet received by the multi-port bridge according to a destination address for the packet wherein the look-up FSM accesses the look-up table via the communication bus; and e. a plurality of registers coupled to the communication bus and accessible to the learning FSM and the look-up FSM wherein the plurality of registers includes a source address register for storing a source address for each packet, a destination address register for storing a destination address for the packet, a port identification register for storing the identification of a port that receives the packet, a memory address register for storing an address within the memory device for a location in look-up table, and one or more table entry registers for storing entries of the look-up table.

21. The apparatus according to claim 20 further comprising a comparator coupled to the source address register and to the one or more table entry registers for comparing a selected bits from the source address for a newly received packet stored by the source address register to selected bits from the source address for a prior packet stored in the one or more table entry registers.

22. The apparatus according to claim 20 further comprising a comparator coupled to the port identification register and to the one or more table entry registers for comparing a port identification for a newly received packet to a port identification for a prior packet.

* * * * *

UNITED STATES PATENT AND TRADEMARK OFFICE
CERTIFICATE OF CORRECTION

PATENT NO.     : 6,308,218 B1
DATED          : October 23, 2001
INVENTOR(S)    : Suresh Vasa It is certified that error appears in the above-identified patent and that said Letters Patent is hereby corrected as shown below:

Column 5,
Line 23, insert -- now U.S. Patent No. 5,940,597 -- between "MEMORY"" and ";".

Signed and Sealed this

Ninth Day of July, 2002

Attest:

JAMES E. ROGAN
Attesting Officer     Director of the United States Patent and Trademark Office